(12) United States Patent
Suzuki et al.

(10) Patent No.: US 8,142,024 B2
(45) Date of Patent: Mar. 27, 2012

(54) IMAGE DISPLAY DEVICE AND ADJUSTMENT METHOD THEREOF

(75) Inventors: Hiroaki Suzuki, Kanagawa (JP); Tetsuaki Iwane, Kanagawa (JP); Mariko Nishiyama, Kanagawa (JP)

(73) Assignee: Sony Corporation (JP)

( * ) Notice: Subject to any disclaimer, the term of this patent is extended or adjusted under 35 U.S.C. 154(b) by 326 days.

(21) Appl. No.: 12/455,406

(22) Filed: Jun. 2, 2009

(65) Prior Publication Data

US 2009/0310041 A1    Dec. 17, 2009

(30) Foreign Application Priority Data

Jun. 13, 2008    (JP) ................ P2008-154864

(51) Int. Cl.
*G02F 1/1335* (2006.01)
(52) U.S. Cl. ........................ 353/31; 349/117
(58) Field of Classification Search .......... 353/31, 353/20; 349/1, 64, 117, 137
See application file for complete search history.

(56) References Cited

U.S. PATENT DOCUMENTS

| 5,225,920 A | * | 7/1993 | Kasazumi et al. ............. 349/1 |
| 5,570,215 A | * | 10/1996 | Omae et al. ................ 349/117 |
| 6,234,634 B1 | | 5/2001 | Hansen et al. |
| 6,447,120 B1 | | 9/2002 | Hansen et al. |

FOREIGN PATENT DOCUMENTS

JP    2003-506746 A    2/2003

* cited by examiner

*Primary Examiner* — Seung C Sohn
(74) *Attorney, Agent, or Firm* — Lerner, David, Littenberg, Krumholz & Mentlik, LLP

(57) ABSTRACT

An image display device includes: an optical modulator; and an optical compensation element configured to cancel out phase difference generated within the optical modulator; wherein the optical compensation element is installed in a state in which the brightness of a projected image corresponding to a region having relatively great phase difference within the optical modulator becomes a minimal value, at the minimum driving voltage to be applied to the optical modulator.

11 Claims, 14 Drawing Sheets

(ARROWS → INDICATE OPTICAL PATHS)

PROJECTED IMAGE

| REGION 1 | 4 | 7 |
|----------|---|---|
| 2 | 5 | 8 |
| 3 | 6 | 9 |

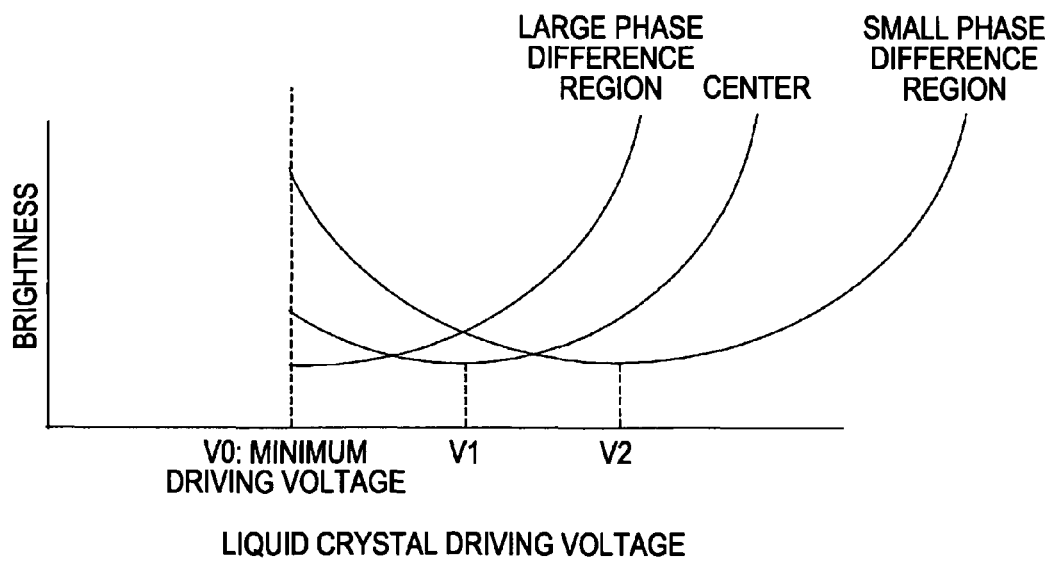

IMAGE DISPLAY DEVICE AND ADJUSTMENT METHOD THEREOF

The present application claims priority from Japanese Patent Application No. JP 2008-154864 filed in the Japanese Patent Office on Jun. 13, 2008, the entire content of which is incorporated herein by reference.

BACKGROUND OF THE INVENTION

1. Field of the Invention

The present invention relates to an image display device and adjustment method thereof.

2. Description of the Related Art

Heretofore, there have been disclosed projection-type image display devices including an illumination device, an optical modulator illuminated by the illumination device, and a projector lens for imaging the image of the optical modulator. These have employed as a light source a discharge lamp, and as an image modulator transmission-type liquid crystal display element (HTPS), reflection-type liquid crystal display element (LCOS), or digital micro-mirror device (DMD), and accordingly, devices and optical system have been improved variously.

The projection-type image display devices include a light source for emitting white light, separate the while light from the light source into three colors of red, green, and blue at a dichroic mirror, and illuminate an optical modulator corresponding to each color. Subsequently, after being modulated at the optical modulator, the optical beams are synthesized by a color synthesizer such as a cross prism or the like, and are projected on a screen by the projector lens.

The schematic configuration of a projection-type image display device according to the related art will be described with the schematic configuration diagram shown in FIG. 14. As shown in FIG. 14, with a projection-type image display device 101, a light emitting unit 112 of a light source 111 is disposed in the focal position of a reflector 113. The light emitted from this light source 111 is reflected off the reflector 113 to become generally parallel light, and is input to a first integrator lens 114 and second integrator lens 115. These lenses have an advantage for uniforming the illuminance of light lately input to an optical modulator 123. The light flux emitted from the second integrator lens 115 is input to a polarization beam splitter 116, where the light is subjected to polarization to obtain light in a predetermined polarization direction. The light emitted from the polarization beam splitter 116 is input and condensed in a condensing lens 117.

The white light emitted from the condensing lens 117 is separated by a dichroic mirror 118. For example, with the dichroic mirror 118, red wavelength band light is transmitted and green wavelength band light and blue wavelength band light are reflected. After being transmitted through a reflective mirror 119 and field lens 120 (120-1), the transmitted red wavelength band light is input to a reflection-type polarization element 121 (121-1), and illuminates an optical modulator 123 (reflection-type liquid crystal display element 123-1).

On the other hand, the light reflected off the dichroic mirror 118 is input to another dichroic mirror 124. With the dichroic mirror 124, the blue wavelength band light is transmitted, and the green wavelength band light is reflected. The separated light fluxes are input to field lenses 120 (120-2), 120 (120-3), reflection-type polarization element 121 (121-2), 121 (121-3), and illuminate optical modulator 123 (reflection-type liquid crystal display element 123-2), and optical modulator 123 (reflection-type liquid crystal display element 123-3), respectively.

Each color beam optically modulated at the optical modulator 123 is input to the reflection-type polarization element 121, and according to degree of modulation, a portion thereof is transmitted to return to the direction of the light source (light source 111), and a portion thereof is reflected to input to a color synthesizing prism 125. The color synthesizing prism 125 is configured such that the green wavelength band light is transmitted, and the blue wavelength band light is reflected. Subsequently, the light fluxes of the respective colors are synthesized and input to a projector lens 126, where the image thereof is enlarged to a predetermined scale factor and projected on a screen (not shown) (e.g., see PCT Japanese Translation Patent Publication No. 2003-506746).

With the optical modulator 123 which is a liquid crystal display element, in order to control the tilt direction of the liquid crystal at the time of applying voltage, a slight angular slope (pretilt) is commonly added to the direction of ±45 degrees as to the incident polarization axis of an optical beam even in a nonelectric field state. Therefore, as to light perpendicularly input to the liquid crystal display element of the optical modulator 123, the liquid crystal display element servers as a minute phase difference element of which the optical axis is 45 degrees. Accordingly, in general, an optical compensation element 122 is employed as an optical element for canceling out this minute phase difference.

Next, description will be made regarding displaying black gradation. In a case where normally black type liquid crystal is employed as the optical modulator 123, and also reflection-type liquid crystal display elements 123-1 through 123-3 are employed, the driving voltage of the liquid crystal becomes a relatively small value when displaying the black gradation side. Accordingly, it is ideal for the polarization state of light between polarization element (incident side), liquid crystal display element, and polarization element (emission side) to be unchangeable.

However, the polarization state of the actual light flux is disarranged due to the extinction ratio of the polarization element, birefringence at a glass material between the polarization element and liquid crystal display element, minute phase difference at the liquid crystal display element, or the like. Further, influence such as device property, heat characteristic, stress from peripheral components, or the like causes the liquid crystal display element to have uneven phase difference property within the plane thereof in some cases.

As described above, in a case where uneven phase difference property is caused within the plane, light fluxes input to the respective positions of the liquid crystal display element each have a different polarization state (elliptical polarization). Accordingly, the transmittance or reflectance when inputting to the polarization element again differs, and consequently, this is displayed as unevenness of brightness on the screen. In a case where unevenness of brightness occurs as to each optical beam of R, G, and B, this is also recognized as unevenness of chromaticity.

SUMMARY OF THE INVENTION

A problem is in that with dark gradation (e.g., black gradation side) display, when uneven phase difference property occurs within the plane of the liquid crystal display, unevenness of brightness occurs on an image projected on a screen, and unevenness of brightness thereof is also recognized as unevenness of chromaticity.

It has been found desirable to enable reduction in unevenness of brightness, and unevenness of chromaticity as to dark gradation.

According to an embodiment of the present invention, an image display device (first image display device) includes: an optical modulator; and an optical compensation element configured to cancel out phase difference generated within the optical modulator; with the optical compensation element being installed in a state in which the brightness of a projected image corresponding to a region having relatively great phase difference within the optical modulator becomes a minimal value, at the minimum driving voltage to be applied to the optical modulator.

With the first image display device, the optical compensation element is set so as to cancel out the phase difference of a region having great phase difference of the optical modulator with the minimum driving voltage to be applied to the optical modulator. For example, the optical axis (phase leading axis, phase delaying axis) and phase difference of the optical compensation element are set. Thus, with the optical compensation element, the brightness of a projected image corresponding to a region having a relatively great phase difference within the optical modulator becomes a minimal value, at the minimum driving voltage to be applied to the optical modulator, whereby the screen entire region can be set to the brightness minimum value with a voltage value which is equal to or greater than the minimum driving voltage. This state is realized, whereby unevenness of brightness and unevenness of chromaticity can be reduced by adjusting input signal/output voltage property at each position within the plane of the optical modulator.

An according to an embodiment of the present invention, an adjustment method (first adjustment method) for an image display device including an optical modulator, and an optical compensation element configured to cancel out phase difference generated within the optical modulator, includes a step of: adjusting the installation position of the optical compensation element in a state in which the brightness of a projected image corresponding to a region having relatively great phase difference within the optical modulator becomes a minimal value, at the minimum driving voltage to be applied to the optical modulator.

With the first adjustment method, for example, the optical axis (phase leading axis, phase delaying axis) and phase difference of the optical compensation element are set so as to cancel out the phase difference of a region having great phase difference of the optical modulator with the minimum driving voltage to be applied to the optical modulator. That is to say, the installation position of the optical compensation element is adjusted such that the brightness of a projected image corresponding to a region having a relatively great phase difference within the optical modulator becomes a minimal value, at the minimum driving voltage to be applied to the optical modulator. Therefore, the screen entire region of the optical modulator can be set to the brightness minimum value with a voltage value which is equal to or greater than the minimum driving voltage. This state is realized, whereby unevenness of brightness and unevenness of chromaticity can be reduced by adjusting input signal/output voltage property at each position within the plane of the optical modulator.

An according to an embodiment of the present invention, an image display device (second image display device) includes: an optical modulator; and an optical compensation element configured to cancel out phase difference generated within the optical modulator; with the optical compensation element being installed in a state in which a project image corresponding to the center portion of the optical modulator becomes the darkest when applying greater voltage than the minimum driving voltage to be applied to the optical modulator.

With the second image display device, the optical compensation element is set so as to cancel out the phase difference of a region having great phase difference as to the phase difference at the center portion of the optical modulator with the minimum driving voltage to be applied to the optical modulator. For example, the optical axis (phase leading axis, phase delaying axis) and phase difference of the optical compensation element are set. Thus, with the optical compensation element, the installation of the optical compensation element is adjusted in a state in which a projected image corresponding to the center portion of the optical modulator becomes the darkest with a voltage value which is equal to or greater than the minimum driving voltage to be applied to the optical modulator, whereby the screen entire region can be set to the brightness minimum value with a voltage value which is equal to or greater than the minimum driving voltage. This state is realized, whereby unevenness of brightness and unevenness of chromaticity can be reduced by adjusting input signal/output voltage property at each position within the plane of the optical modulator.

An according to an embodiment of the present invention, an adjustment method (second adjustment method) for an image display device including an optical modulator, and an optical compensation element configured to cancel out phase difference generated within the optical modulator, includes a step of: adjusting the installation position of the optical compensation element in a state in which a project image corresponding to the center portion of the optical modulator becomes the darkest when applying greater voltage than the minimum driving voltage to be applied to the optical modulator.

With the second adjustment method, for example, the optical axis (phase leading axis, phase delaying axis) and phase difference of the optical compensation element are set so as to cancel out the phase difference of a region having great phase difference as to the phase difference at the center portion of the optical modulator with the minimum driving voltage to be applied to the optical modulator. That is to say, the installation position of the optical compensation element is adjusted in a state in which a projected image corresponding to the center portion of the optical modulator becomes the darkest with the minimum driving voltage to be applied to the optical modulator. Therefore, the screen entire region of the optical modulator can be set to the brightness minimum value with a voltage value which is equal to or greater than the minimum driving voltage. This state is realized, whereby unevenness of brightness and unevenness of chromaticity can be reduced by adjusting input signal/output voltage property at each position within the plane of the optical modulator.

The first image display device has an advantage wherein unevenness of brightness and unevenness of chromaticity can be reduced while maintaining a high contrast ratio, and accordingly, a high-quality image can be realized.

The first adjustment method has an advantage wherein unevenness of brightness and unevenness of chromaticity can be reduced while maintaining a high contrast ratio, and accordingly, a high-quality image can be realized.

The second image display device has an advantage wherein unevenness of brightness and unevenness of chromaticity can be reduced while maintaining a high contrast ratio, and accordingly, a high-quality image can be realized.

The second adjustment method has an advantage wherein unevenness of brightness and unevenness of chromaticity can be reduced while maintaining a high contrast ratio, and accordingly, a high-quality image can be realized.

BRIEF DESCRIPTION OF THE DRAWINGS

FIGS. 5A and 5B are explanatory diagrams of a second setting method of an optical compensation element;

DESCRIPTION OF THE PREFERRED EMBODIMENTS

Figure 1:
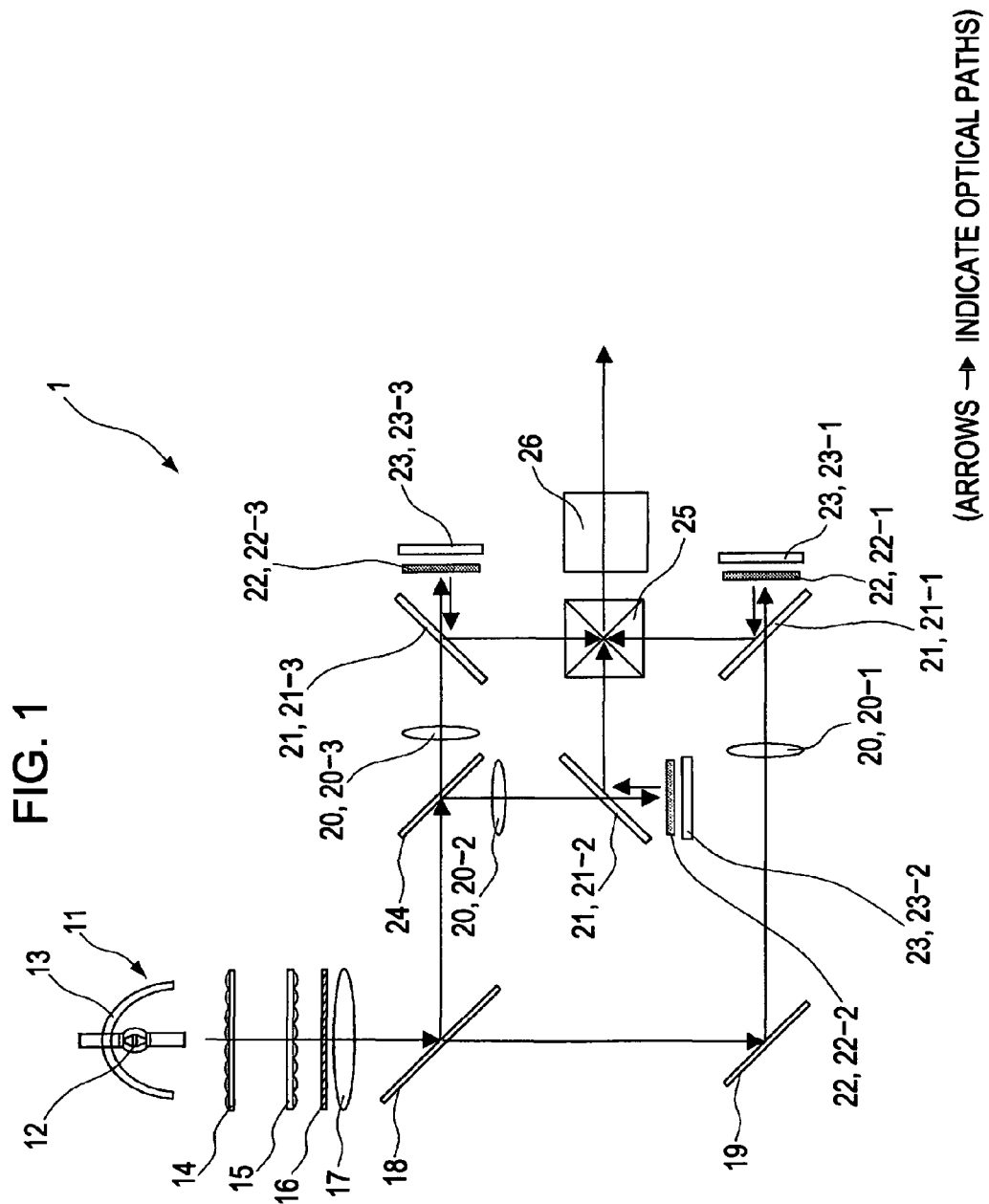
FIG. 1 is a schematic configuration diagram illustrating an imager display device according to an embodiment (first embodiment) of the present invention.

An image display device according to an embodiment (first embodiment) of the present invention will be described with reference to the schematic configuration diagram in FIG. 1. As shown in FIG. 1, a light source 11 is provided in an image display device 1. A light emitting unit 12 of the light source 11 is disposed in the focal position of a reflector 13. Also, the reflector 13 reflects the light emitted from the light source 11 to output this as generally parallel light. A first integrator lens 14 and a second integrator lens 15 are installed sequentially on the optical path of the light reflected off the reflector 13. The first integrator lens 14 and second integrator lens 15 uniform the illuminance of light to be input to a later-described optical modulator 23. A polarization beam splitter 16 is installed on the optical path of the light emitted from the second integrator lens 15. The polarization beam splitter 16 is for polarizing incident light into light in a predetermined polarization direction. A condensing lens 17 is provided on the optical path of the light emitted from the polarization beam splitter 16.

A dichroic mirror 18 is installed on the optical path of the light emitted from the condensing lens 17. The dichroic mirror 18 separates incident light into red wavelength band light, green wavelength band light, and blue wavelength band light. For example, the dichroic mirror 18 transmits the red wavelength band light, and reflects the green wavelength band light and blue wavelength band light. A reflective mirror 19 is provided on the optical path of the transmitted red wavelength band light, and a field lens 20 (20-1) is installed on the optical path of the light reflected off the reflective mirror 19. A reflection-type polarization element 21 (21-1) is installed on the optical path of the light transmitted through the field lens 20 (20-1). An optical compensation element 22 (22-1), and a reflection-type liquid crystal display element 23-1 which is an optical modulator 23 are installed on the optical path of the light transmitted through the reflection-type polarization element 21 (21-1).

On the other hand, a dichroic mirror 24 is provided on the optical path of the light reflected off the dichroic mirror 18. The dichroic mirror 24 transmits, of incident light, blue wavelength band light, and reflects the green wavelength band light. A field lens 20 (20-2) is installed on the optical path of one separated optical flux (green wavelength band light flux). A reflection-type polarization element 21 (21-2) is installed on the optical path of the light transmitted through the field lens 20 (20-2). An optical compensation element 22 (22-2), and a reflection-type liquid crystal display element 23-2 which is the optical modulator 23 are installed on the optical path of the light transmitted through the reflection-type polarization element 21 (21-2).

A field lens 20 (20-3) is installed on the optical path of the other separated light flux (blue wavelength band light flux). A reflection-type polarization element 21 (21-3) is installed on the optical path of the light transmitted through the field lens 20 (20-3). An optical compensation element 22 (22-3), and a reflection-type liquid crystal display element 23-3 which is the optical modulator 23 are installed on the optical path of the light transmitted through the reflection-type polarization element 21 (21-3).

The reflection-type liquid crystal display element 23-1 is for subjecting the red wavelength band light to optical modulation. The light subjected to optical modulation by the reflection-type liquid crystal display element 23-1 is input to the reflection-type polarization element 21 (21-1) through the optical compensation element 22 (22-1) again, and according to the degree of modulation, a portion thereof is transmitted to be returned to the light source direction, and a portion thereof is reflected. A color synthesizing prism 25 is installed at a position to which this reflected light is input. Also, the reflection-type liquid crystal display element 23-2 is for subjecting the green wavelength band light to optical modulation. The light subjected to optical modulation by the reflection-type liquid crystal display element 23-2 is input to the reflection-type polarization element 21 (21-2) through the optical compensation element 22 (22-2) again, and according to the degree of modulation, a portion thereof is transmitted to be returned to the light source direction, and a portion thereof is reflected. The color synthesizing prism 25 is installed at a position to which this reflected light is input. Similarly, the reflection-type liquid crystal display element 23-3 is for subjecting the blue wavelength band light to optical modulation. The light subjected to optical modulation by the reflection-type liquid crystal display element 23-3 is input to the reflection-type polarization element 21 (21-3) through the optical compensation element 22 (22-3) again, and according to the degree of modulation, a portion thereof is transmitted to be returned to the light source direction, and a portion thereof is reflected. The color synthesizing prism 25 is installed at a position to which this reflected light is input.

The color synthesizing prism 25 is configured to transmit the green wavelength band light, and reflect the red wavelength band light and blue wavelength band light, and is for synthesizing the light fluxes of the respective colors. A projector lens 26 is installed in the emission direction of the synthesized light. The projector lens 26 enlarges incident light to a predetermined scale factor to emit this. A screen (not shown) where the image emitted from the projector lens 26 is projected is installed in the emission direction thereof.

Each of the above-mentioned respective optical compensation elements 22 is installed in a state in which the brightness of a projected image corresponding to a region having relatively great phase difference within each of the respective optical modulators 23 becomes a minimal value with the minimum driving voltage V0 to be applied to the above-mentioned optical modulator 23 corresponding to each of the optical compensation elements 22. For example, multiple voltage values at the time of OIRE are provided so as to correspond to each position within the plane of the optical modulator 23. Each of the multiple voltage values becomes a brightness minimal voltage value.

Next, the operation of the above-mentioned image display device 1 will be described with reference to FIG. 1. As shown in FIG. 1, the light emitted from the light emitting unit 12 of the light source 11 is reflected off the reflector 13 to become generally parallel light, and is input from the first integrator lens 14 to the second integrator lens 15 to uniform the illuminance of the light to be input to the respective optical modulators 23. Subsequently, the light flux emitted from the second integrator lens 15 is input to the polarization beam splitter 16, and is subjected to polarization into polarized light in a predetermined polarization direction.

The light subjected to polarization and emitted by the polarization beam splitter 16 is input and condensed in the condensing lens 17, and is input to the dichroic mirror 18. With regard to the light input to the dichroic mirror 18, for example, the red wavelength band light is transmitted, and the green wavelength band light and blue wavelength band light are reflected. The red wavelength band light transmitted through the dichroic mirror 18 is transmitted through the reflective mirror 19 and field lens 20 (20-1), and is then input to the reflection-type polarization element 21 (21-1), and is illuminated on the optical modulator 23 (reflection-type liquid crystal element 23-1) through the optical compensation element 22 (22-1).

On the other hand, the light reflected off the dichroic mirror 18 is input to the dichroic mirror 24. With the dichroic mirror 24, the blue wavelength band light is transmitted, and the green wavelength band light is reflected. One of the separated light fluxes (green wavelength band light flux) is input to the field lens 20 (20-2), and reflection-type polarization element 21 (21-2), and is illuminated on the reflection-type liquid crystal display element 23-2 which is the optical modulator 23 through the optical compensation element 22 (22-2). The other separated light flux (blue wavelength band light flux) is input to the field lens 20 (20-3), and reflection-type polarization element 21 (21-3), and is illuminated on the reflection-type liquid crystal display element 23-3 which is the optical modulator 23 through the optical compensation element 22 (22-3).

The red wavelength band light subjected to optical modulation at the reflection-type liquid crystal display element 23-1 is input to the reflection-type polarization element 21 (21-1) through the optical compensation element 22 (22-1) again, and according to the degree of modulation, a portion thereof is transmitted through the reflection-type polarization element 21 (21-1) to be returned to the light source direction, and a portion thereof is reflected off the reflection-type polarization element 21 (21-1) to be input to the color synthesizing prism 25. Also, the green wavelength band light subjected to optical modulation at the reflection-type liquid crystal display element 23-2 is input to the reflection-type polarization element 21 (21-2) through the optical compensation element 22 (22-2) again, and according to the degree of modulation, a portion thereof is transmitted through the reflection-type polarization element 21 (21-2) to be returned to the light source direction, and a portion thereof is reflected off the reflection-type polarization element 21 (21-2) to be input to the color synthesizing prism 25. Further, the blue wavelength band light subjected to optical modulation at the reflection-type liquid crystal display element 23-3 is input to the reflection-type polarization element 21 (21-3) through the optical compensation element 22 (22-3) again, and according to the degree of modulation, a portion thereof is transmitted through the reflection-type polarization element 21 (21-3) to be returned to the light source direction, and a portion thereof is reflected off the reflection-type polarization element 21 (21-3) to be input to the color synthesizing prism 25.

The color synthesizing prism 25 transmits the green wavelength band light, and reflects the red wavelength band light and blue wavelength band light. Subsequently, the light fluxes of the respective colors are synthesized and input to the projector lens 26, where the image thereof is enlarged to a predetermined scale factor and projected on a screen (not shown).

Now, with regard to displaying black gradation, an example of the reflection-type liquid crystal display device will be described as the image display device 1 by employing a liquid crystal display element of VA orientation as an example of the optical modulator 23.

When displaying the black gradation side, the driving voltage of the liquid crystal display element becomes a relatively small value, so it is ideal for the polarization state of light between polarization element (incident side), liquid crystal display element, and polarization element (emission side) to be unchangeable.

However, with the liquid crystal display element, in order to control the tilt direction of the liquid crystal at the time of applying voltage, a slight angular slope (pretilt) is commonly added to the direction of ±45 degrees as to the incident polarization axis of an optical beam even in a nonelectric field state. Therefore, as to light perpendicularly input to the liquid crystal display element, the liquid crystal display element servers as a minute phase difference element of which the optical axis is 45 degrees. Accordingly, in general, an optical compensation element is employed as an optical element for canceling out this minute phase difference.

Figure 2:
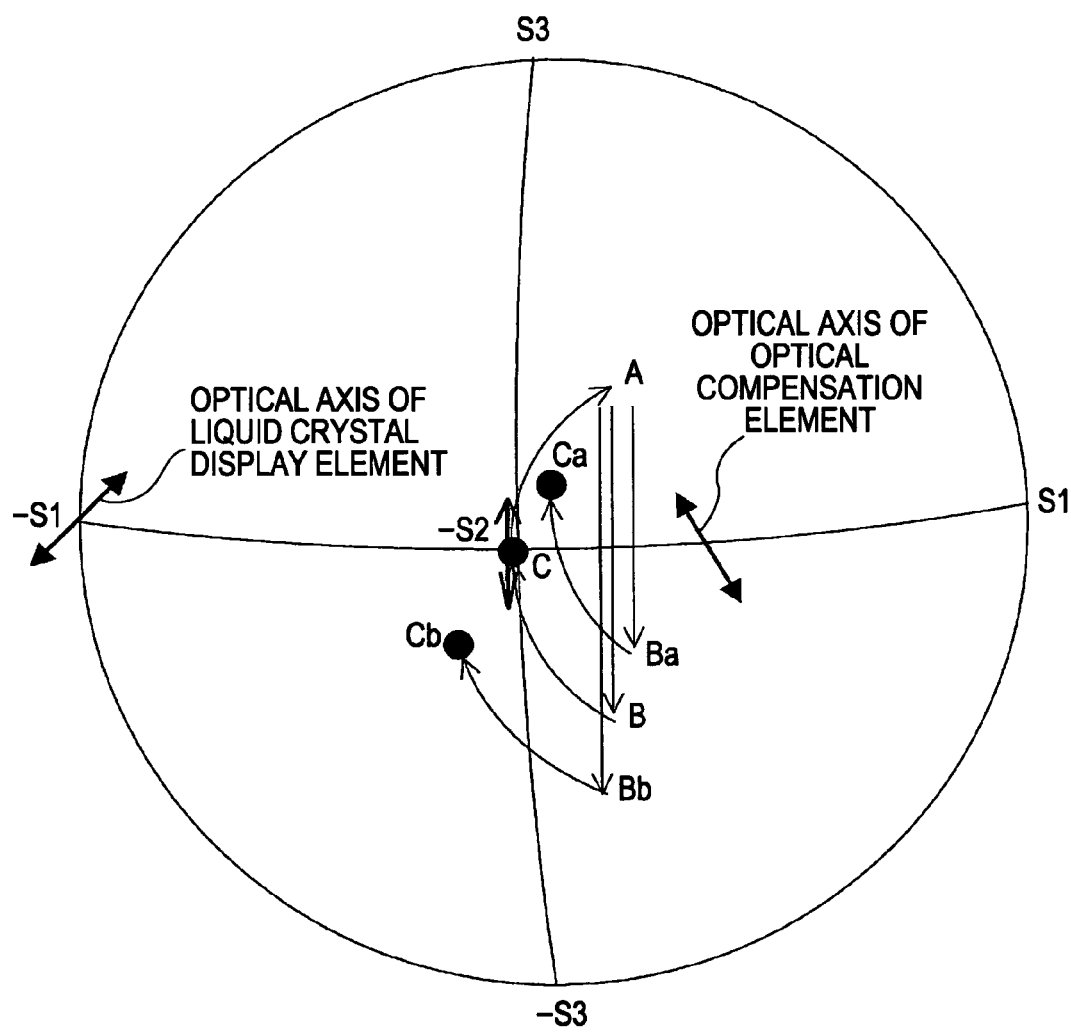
FIG. 2 is an explanatory diagram of a polarization state due to a Poincare sphere indicating an example of the role of an optical compensation element.

An example of the role of the optical compensation element will be described with reference to the Poincare sphere in FIG. 2. FIG. 2 illustrates the polarization state of a light flux parallel to the optical axis at the periphery of the liquid crystal display element on a Poincare sphere. Specifically, let us say that the polarization state after transmission of the polarization element (incident side) is taken as 0 degree (−S2 on the Poincare sphere), the phase leading axis of the liquid crystal is taken as −45 degrees (−S3) as to the polarization axis, and the phase leading axis of the optical compensation element is in a range of 0 through 45 degrees.

As shown in FIG. 2, upon an optical beam transmitted through the incident-side polarization element being input to the optical compensation element 22, the optical beam is affected by the phase leading axis and phase difference to become a polarization state A in the drawing, i.e., a clockwise elliptical polarization state. Further, the optical beam is reflected off the optical modulator 23 (e.g., reflection-type liquid crystal element) to become a polarization state B (counterclockwise elliptical polarization), is transmitted through the optical compensation element 22 again to become a state C, and is input to the reflection-type polarization element 21 (emission side) again. With the optical compensation element 22, the parameters such as a phase leading axis angle, phase difference, and so forth are selected such that the optical beam becomes the same polarization state as that transmitted through the reflection-type polarization element 21 (incident side) (state C). Ideally, employing the optical compensation element 22 designed as described above cancels out minute phase difference of the optical modulator 23, and consequently, the polarization state of the optical beam is not disarranged.

However, in reality, the unevenness of very minute phase difference occurs even with the liquid crystal plane of the optical modulator 23 due to unevenness of the orientations of liquid crystal elements of the optical modulator 23, unevenness of cell gaps, unevenness of manufacturing processes, or the like in some cases, and in this case, the polarization state is disarranged as follows.

Let us say that a great phase difference region and small phase difference region are distributed within the plane as to the center of the optical modulator 23, i.e., as to the phase difference of the screen center. In this state, in a case where the optical axis and phase difference of the optical compensation element 22 are set so as to cancel out the phase difference of the center of the optical modulator 23 with the minimum driving voltage V0, the polarization state of the optical beam returns to a linear polarization state similar to after emission from the reflection-type polarization element 21 (incident side) through A, B, and C, as described above.

However, with the great phase difference region, the polarization state of the optical beam is changed to A, Bb, and Cb, and with the small phase difference region, the polarization state of the optical beam is changed to A, Ba, and Ca, and consequently, both do not return to the original linear polarization state, and become a polarization state having an elliptical component. In this case, the optical beam leaks from the reflection-type polarization element 21 (emission side) to the projector lens side, and accordingly, unevenness of brightness occurs on the screen regardless of a black state. Further, in a case where the respective colors of RGB are synthesized, unevenness of chromaticity occurs.

As a technique for reducing unevenness of brightness within the plane, there can be conceived a method for changing applied voltage within each plane depending on the size of the phase difference within the optical modulator 23 (so-called 3Dγ method). For example, a screen region is divided into around hundred regions, and individual input signal/output signal property is given to each of the regions, whereby an even image can be realized without unevenness of brightness and chromaticity. However, this method does not have to be employed for the gradation on the black side.

Figure 3:
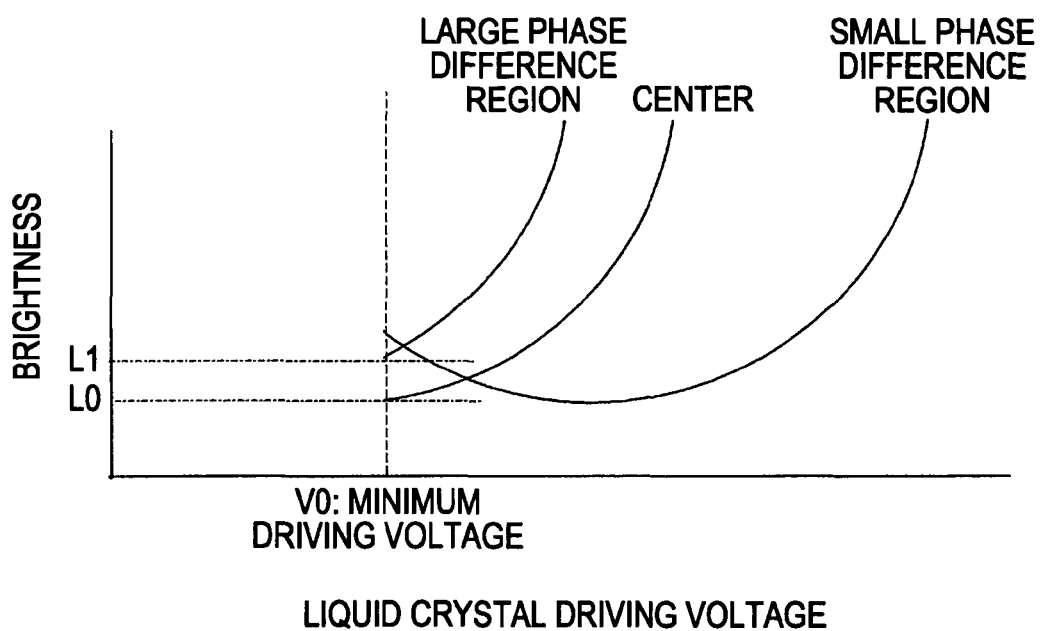
FIG. 3 is a voltage/brightness property diagram.

As an example, the voltage/brightness property between the phase differences at the screen center, great phase difference region, and small phase difference region will be described in a case where the optical compensation element is set such as described in FIG. 2, with reference to FIG. 3. As shown in FIG. 3, the optical compensation element 22 is set so as to cancel out the phase difference at the screen center with the minimum driving voltage V0, so the brightness at the screen center becomes a minimal value with the voltage V0, and the brightness at the small phase difference region becomes a brightness minimal value with the voltage satisfying V>V0. Note that the value of V at this time depends on the property of each element such as the difference of the phase differences of the optical modulators 23, the phase leading axial angle and phase difference and so forth of the optical compensation element 22. On the other hand, with the great phase difference region, there is no brightness minimal value with V0 or greater, and the brightness increases along with application of voltage.

Similar description will be made with reference to FIG. 2. With the small phase difference region in the polarization state Ba, the polarization state Ba can return to the polarization state B by applying voltage to the optical modulator 23. However, with the great phase difference region in the polarization state Bb, the polarization state Bb does not return to the polarization state B even if voltage is applied to the optical modulator 23. Therefore, when attempting to uniform the brightness within the screen, coordinating has to be made with the minimum brightness with the great phase difference region. In this case, as can be understood from FIG. 3, the brightness increases as to the screen center, and consequently, there is a great disadvantage wherein contrast decreases.

To this end, with the present invention, the optical axis (phase leading axis, phase delaying axis) and phase difference of the optical compensation element 22 are adjusted so as to cancel out the phase difference of a region having a relatively great phase difference of the optical modulator 23 with the minimum driving voltage V0. An example of the first setting method will be described below.

Figures 4A, 4B:
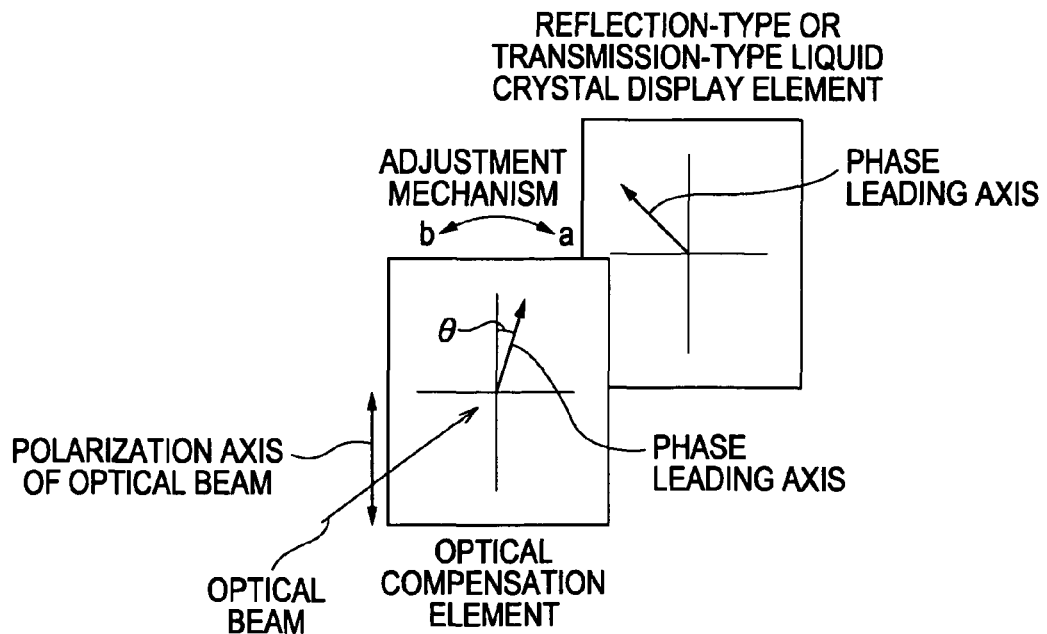
FIGS. 4A and 4B are explanatory diagrams of a first setting method of an optical compensation element.

The first setting method will be performed as follows. That is to say, as shown in FIG. 4A, an image is projected on the entire region of the optical modulator 23 (liquid crystal display element) through the projector lens 26 with the driving voltage V0. As shown in FIG. 4B, upon the optical compensation element 22 being rotated in this state, the phase leading axis of the optical compensation element 22 changes. In a case where a phase difference distribution within the plane of the optical modulator 23 is even, the brightness of the screen entire region becomes the minimum at a particular position, so the phase leading axis of the optical compensation element 22 should be set in this position. However, in a case where there is unevenness of phase difference within the plane of the optical modulator 23, the rotation angle where the brightness of an image projected by rotating the optical compensation element 22 becomes the minimum depends on positions within the image.

For example, let us say that, in FIG. 4A, as to a center region 5 of a projected image, the phase difference of a region 1 is greater, and the phase difference of a region 3 is smaller. At this time, if we say that the rotation position of the optical compensation element 22 has been adjusted such that the brightness of the center region 5 becomes the minimum, in order to minimize the brightness of the region 1, the rotation position should be moved in a direction a, and in order to minimize the brightness of the region 3, the rotation position should be moved in a direction b.

That is to say, if we say that the maximum value of rotation angles θ1 through θ9 of the optical compensation element 22, which minimizes the brightness of each of the regions 1 through 9, is θMAX, and if we set θ=θMAX in FIG. 4B, the phase difference of a region having the greatest phase difference can be canceled out consequently. Ideally, the phase difference of a region having the greatest phase difference, of the optical modulator 23 should be canceled out as much as possible. However, this is not indispensable, and rather, a region having a relatively great phase difference is determined to be canceled out, whereby an even image having little unevenness can be realized. Also, with this example, the image region is divided into nine, but may be divided into any appropriate number, whether five or a hundred, i.e., the number of divisions should be determined on balance with desired performance. Also, with this example, when searching a region having a relatively great phase difference, the projected image is observed while rotating the optical compensation element 22. For example, in a case where the phase difference distribution peculiar to the optical modulator 23 is known, and for example, in a case where it has been known that the phase difference between the regions 1 and 9 is great, the optical compensation element 22 should be adjusted so as to reduce the brightness of these regions.

Next, an example of the second setting method will be described. The second setting method is performed as follows. That is to say, as shown in FIG. 5A, with the phase difference distribution within the plane of the optical modulator 23, (1) Case where the phase difference of a certain region of the screen, e.g., the phase difference of the region 5 in FIG. 5A is relatively smaller than the phase differences of other regions, or (2) Case where the phase difference of a certain region of the screen is known to be around the center as compared to the phase differences of the other regions, the following adjustment method is available.

For example, let us say that a certain optical modulator 23 has the following particular phase difference distribution. For example, let us say that the phase difference of the region 1 is great, the phase difference of the region 7 is small, and the phase difference of the region 5 is around an average between the regions 1 and 7. Such a phase difference distribution can occur due to the process cause of the optical modulator 23, or the like. In this case, the minimum driving voltage as to the optical modulator 23 is set from V0 to V1 (>V0), and an image is projected through the projector lens. In this state, the optical compensation element 22 is rotated and fixed such that the brightness of the region 5 becomes the minimum.

In a case where the position of the optical compensation element 22 has been set thus, as shown in FIG. 5B, the region 5 has brightness/driving voltage property wherein the brightness becomes the minimum at the voltage V1 like the center. Conversely, with the region 1 having a greater phase difference, similar to the great phase difference region, the voltage which minimizes the brightness becomes smaller than V1, and with the region 7 having a smaller phase difference, similar to the small phase difference region, the voltage which minimizes the brightness becomes greater than V1. Now, if we say that the driving voltage V1 is set such that the region 7 having a greater phase difference becomes around a brightness minimal value around the driving voltage V0, the driving voltage can be set such that a region having a great phase difference becomes a brightness minimal value around the driving voltage V0, consequently.

According to the above-mentioned adjustment, the minimum driving voltage of a region having a great phase difference can be set to V0. This method is advantageous in that the optical compensation element 22 should be adjusted by viewing only one point within the screen in a case where the optical modulator 23 has a particular phase difference distribution. Similarly, even in a case where the phase difference of a certain region (e.g., region 5) of the screen is relatively small as compared to the phase differences of the other regions, the optical compensation element 22 is set such that the region 5 becomes a brightness minimal value at the voltage V1, and also the voltage V1 is set such that the other regions become a brightness minimal value around the voltage V0, whereby the same adjustment method can be performed.

Figure 6:
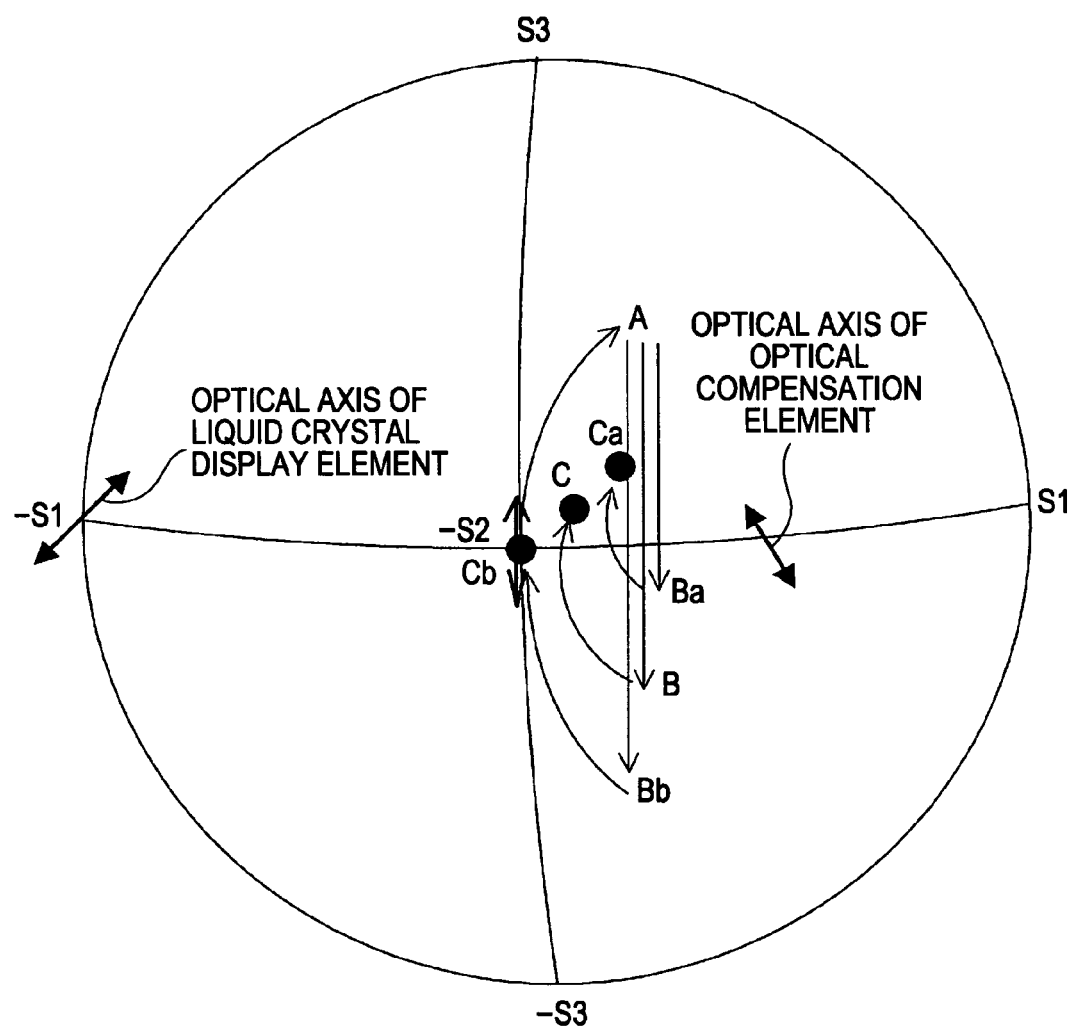
FIG. 6 is an explanatory diagram of a polarization state due to a Poincare sphere.
Figure 7:
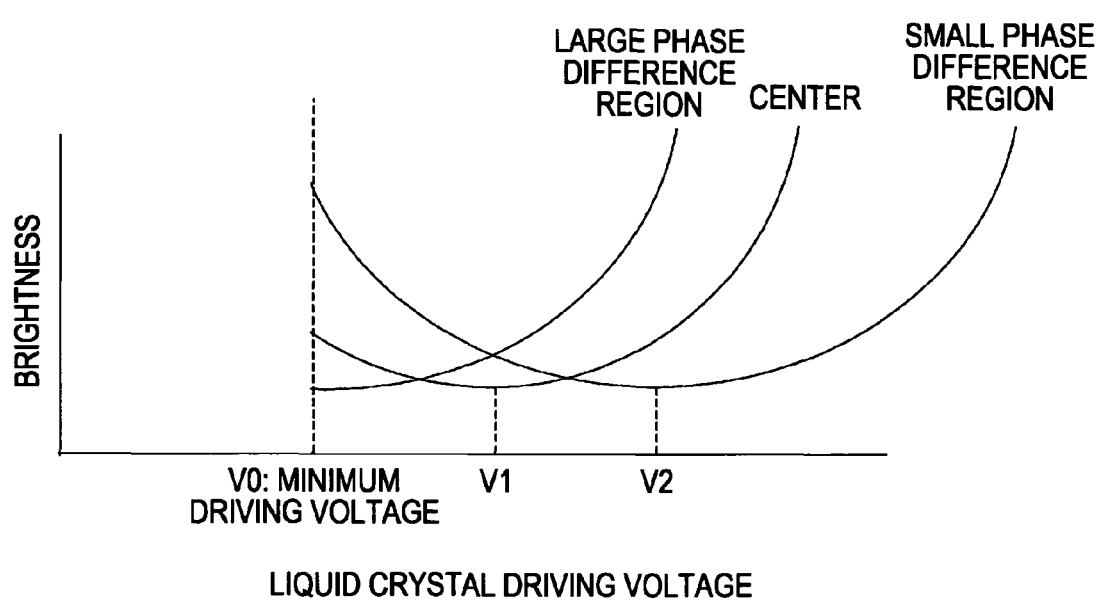
FIG. 7 is a voltage/brightness property diagram on the low voltage side.

Settings are performed as described above, whereby the polarization state can be represented such as shown in FIG. 6, and the voltage/brightness property on the low voltage side can be represented such as shown in FIG. 7. As shown in FIG. 7, upon referencing the voltage/brightness property, the phase leading axis and phase difference of the optical compensation element 22 are set so as to cancel out the phase difference of the great phase difference region as to the minimum driving voltage V0, whereby the great phase difference region becomes a brightness minimal value at V0.

On the other hand, the brightness minimal values of the screen center, and the small phase difference region become V0 or greater, so electric adjustment is added to the output voltage, for example, at the time of OIRE (IRE: unit representing the amplitude of a video signal, U.S. radio institute), such as V0 [V] for the great phase difference region, V1 [V] for the screen center, and V2 [V] for the small phase difference region, whereby a high-quality image having a high contrast ratio can be realized with little unevenness of brightness and chromaticity.

The above-mentioned relations will be described as the polarization state on a Poincare sphere with reference to FIG. 6. As shown in FIG. 6, with the great phase difference region, the polarization state after transmitting through the reflection-type polarization element 21 (incident side) is coordinated with the polarization state before inputting to the reflection-type polarization element 21 (emission side). Specifically, the angle of the optical axis (phase leading axis, phase delaying axis) and phase difference of the optical compensation element 22 are set so as to realize a state of having no polarization disorder. According to such a setting, even if the polarization state becomes a state B due to the screen center, or state Ba due to the small phase difference region, both can be changed to the polarization state Bb by applying voltage to the liquid crystal, and consequently, a state having no polarization disorder can be realized as to the screen entire region.

With the above-mentioned image display device 1, the optical compensation element 22 is set so as to cancel out the phase difference of a region having great phase difference of the optical modulator 23 with the minimum driving voltage V0 to be applied to the optical modulator 23. For example, the optical axis (phase leading axis, phase delaying axis) and phase difference of the optical compensation element 22 are set. Thus, with the optical compensation element 22, the brightness of a projected image corresponding to a region having a relatively great phase difference within the optical modulator 23 becomes a minimal value with the minimum driving voltage V0 to be applied to the optical modulator 23, whereby the screen entire region can be set to the brightness minimum value with a voltage value which is equal to or greater than the minimum driving voltage V0. This state is realized, whereby unevenness of brightness and unevenness of chromaticity can be reduced by adjusting input signal/output voltage property at each position within the plane of the optical modulator 23. Thus, unevenness of brightness and unevenness of chromaticity can be reduced while maintaining a high contrast ratio, and accordingly, a high-quality image can be realized.

Also, with the adjustment method of the above-mentioned image display device 1, for example, the optical axis (phase leading axis, phase delaying axis) and phase difference of the optical compensation element 22 are set so as to cancel out the phase difference of a region having great phase difference of the optical modulator 23 with the minimum driving voltage V0 to be applied to the optical modulator 23. That is to say, the installation position of the optical compensation element 22 is adjusted in a state in which the brightness of a region having a relatively great phase difference within the optical modulator 23 becomes a minimal value with the minimum driving voltage V0 to be applied to the optical modulator 23. Therefore, the screen entire region of the optical modulator 23 can be set to the brightness minimum value with a voltage value which is equal to or greater than the minimum driving voltage. This state is realized, whereby unevenness of brightness and unevenness of chromaticity can be reduced by adjusting input signal/output voltage property at each position within the plane of the optical modulator 23. Thus, unevenness of brightness and unevenness of chromaticity can be reduced while maintaining a high contrast ratio, and accordingly, the advantage of a high-quality image can be realized.

Figure 8:
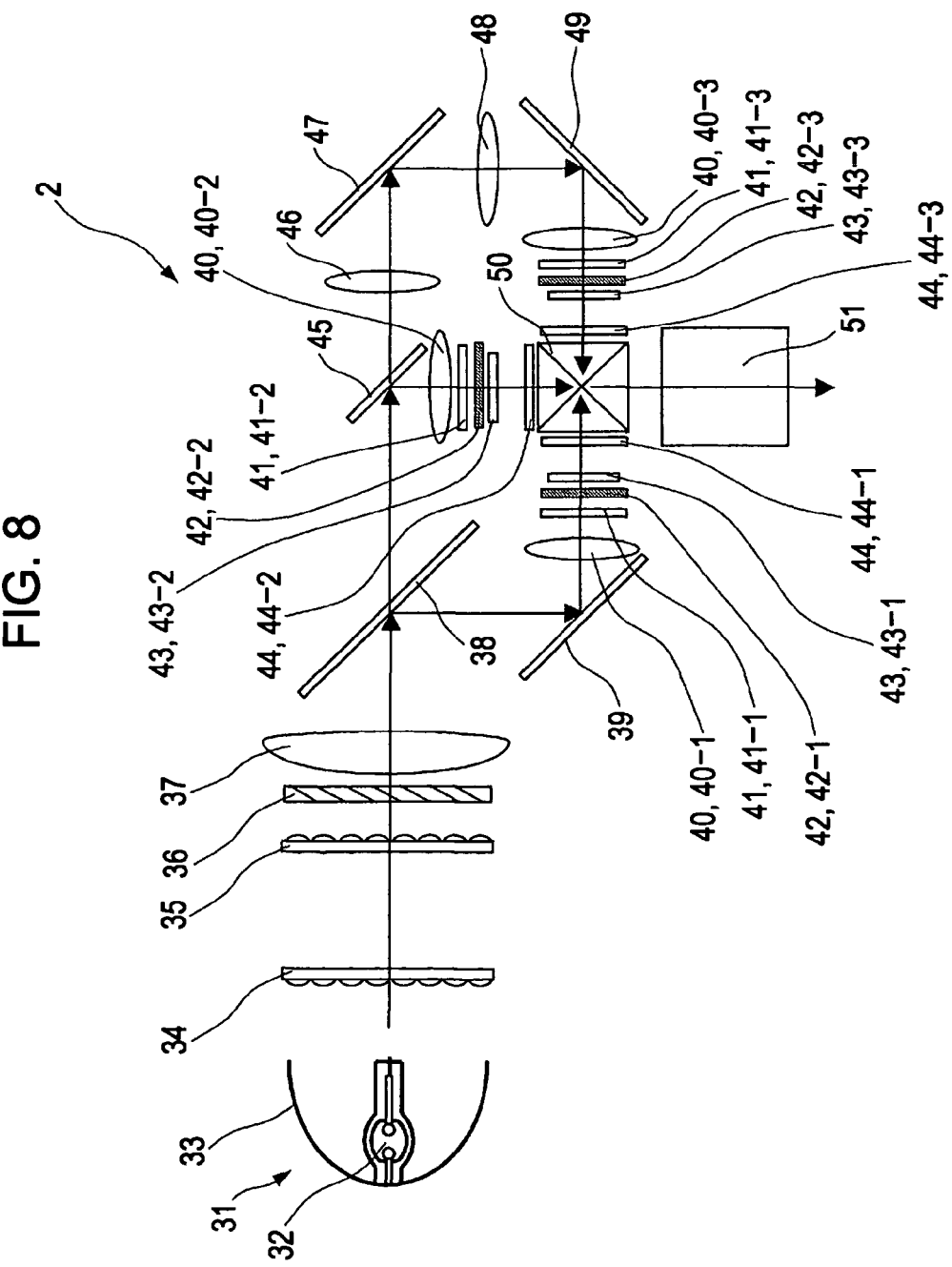
FIG. 8 is a schematic configuration diagram illustrating an imager display device according to an embodiment (second embodiment) of the present invention.

An image display device according to an embodiment (second embodiment) of the present invention will be described next with reference to the schematic configuration diagram in FIG. 8. As shown in FIG. 8, a lamp 31 is provided in an image display device 2. A light emitting unit 32 of the lamp 31 is disposed in the focal position of a reflector 33. Also, the reflector 33 reflects the light emitted from the lamp 31 to output this as generally parallel light. A first integrator lens 34 and a second integrator lens 35 are installed sequentially on the optical path of the light reflected off the reflector 33. The first integrator lens 34 and second integrator lens 35 uniform the illuminance of light to be input to a later-described optical modulator 43. A polarization beam splitter 36 is installed on the optical path of the light emitted from the second integrator lens 35. The polarization beam splitter 36 is for polarizing incident light into light in a predetermined polarization direction. A condensing lens 37 is provided on the optical path of the light emitted from the polarization beam splitter 36.

A dichroic mirror 38 is installed on the optical path of the light emitted from the condensing lens 37. The dichroic mirror 38 separates incident light into red wavelength band light, green wavelength band light, and blue wavelength band light. For example, the dichroic mirror 38 transmits the red wavelength band light, and reflects the green wavelength band light and blue wavelength band light. A reflective mirror 39 is provided on the optical path of the transmitted red wavelength band light, and a field lens 40 (40-1) is installed on the optical path of the light reflected off the reflective mirror 39. A transmission-type polarization element 41 (41-1) on the incident side, an optical compensation element 42 (42-1), a transmission-type liquid crystal display element 43-1 which is an optical modulator 43, a transmission-type polarization element 44 (44-1) on the emission side are installed sequentially on the optical path of the light transmitted through the field lens 40 (40-1).

On the other hand, a dichroic mirror 45 is provided on the optical path of the light reflected off the dichroic mirror 38. The dichroic mirror 45 transmits, of incident light, blue wavelength band light, and reflects the green wavelength band light. A field lens 40 (40-2) is installed on the optical path of one separated optical flux (green wavelength band light flux). A transmission-type polarization element 41 (41-2) on the incident side, an optical compensation element 42 (42-2), a transmission-type liquid crystal display element 43-2 which is the optical modulator 43, and a transmission-type polarization element 44 (44-2) on the emission side are installed sequentially on the optical path of the light transmitted through the field lens 40 (40-2).

A projector lens 46, and a reflective mirror 47 are installed on the optical path of the other separated light flux (blue wavelength band light flux). A relay lens 48, and a reflective mirror 49 are installed on the optical path of the light reflected off the reflective mirror 47. A filed lens 40 (40-3) is installed on the optical path of the light reflected off the reflective mirror 49. A transmission-type polarization element 41 (41-3), an optical compensation element 42 (42-3), a transmission-type liquid crystal display element 43-3 which is the optical modulator 43, and a transmission-type polarization element 44 (44-3) on the emission side are installed sequentially on the optical path of the light transmitted through the field lens 40 (40-3).

The transmission-type liquid crystal display element 43-1 is for subjecting the red wavelength band light to optical modulation. The light subjected to optical modulation by the transmission-type liquid crystal display element 43-1 is input to the transmission-type polarization element 44 (44-1) on the emission side, and according to the degree of modulation of the transmission-type liquid crystal display element 43-1, a portion thereof is transmitted, and a portion thereof is absorbed. A color synthesizing prism 50 is installed at a position to which this transmitted light is input. The transmission-type liquid crystal display element 43-2 is for subjecting the green wavelength band light to optical modulation. The light subjected to optical modulation by the transmission-type liquid crystal display element 43-2 is input to the transmission-type polarization element 44 (44-2) on the emission side, and according to the degree of modulation of the transmission-type liquid crystal display element 43-2, a portion thereof is transmitted, and a portion thereof is absorbed. The color synthesizing prism 50 is installed at a position to which this transmitted light is input. The transmission-type liquid crystal display element 43-3 is for subjecting the blue wavelength band light to optical modulation. The light subjected to optical modulation by the transmission-type liquid crystal display element 43-3 is input to the transmission-type polarization element 44 (44-3) on the emission side, and according to the degree of modulation of the transmission-type liquid crystal display element 43-3, a portion thereof is transmitted, and a portion thereof is absorbed. The color synthesizing prism 50 is installed at a position to which this transmitted light is input.

The color synthesizing prism 50 is configured to transmit the green wavelength band light, and reflect the red wavelength band light and blue wavelength band light, and is for synthesizing the light fluxes of the respective colors. A projector lens 51 is installed in the emission direction of the synthesized light. The projector lens 51 enlarges incident light to a predetermined scale factor to emit this. A screen (not shown) where the image emitted from the projector lens 51 is projected is installed in the emission direction thereof.

Each of the above-mentioned respective optical compensation elements 42 is installed in a state in which the center portion of each of the optical modulators 43 becomes the darkest when applying greater voltage than the minimum driving voltage V0 to be applied to the optical modulator 43 corresponding to each of the optical compensation elements 42.

For example, multiple voltage values at the time of OIRE are provided so as to correspond to each position within the plane of the optical modulator 43. Each of the multiple voltage values becomes a brightness minimal voltage value.

Also, the above-mentioned image display device 2 may be a three-LCD-type image display device. For example, optical modulators 43 (43-1, 43-2, and 43-3) made up of three transmission-type liquid crystal elements of the three-LCD-type image display device modulate optical beams of the red, green, and blue channels, respectively. Subsequently, at least the green-channel transmission-type liquid crystal element 43-2 includes an optical compensation element 42-2 having operation for canceling out phase difference generated therein. The optical compensation element 42-2 is installed in a state in which a projected image corresponding to the center portion of the green-channel transmission-type liquid crystal element 43-2 becomes the darkest when applying voltage greater than the minimum driving voltage V0 to be applied to the green-channel transmission-type liquid crystal display element 43-2.

Also, in a case where the optical modulator 43 has a phase difference distribution within the plane thereof, voltage is set so as to make the brightness of a projected image corresponding to a region having a great phase difference within the plane of the optical modulator 43 the darkest when applying the voltage to the optical modulator 43.

Next, the operation of the above-mentioned image display device 2 will be described with reference to FIG. 8. As shown in FIG. 8, the light emitted from the light emitting unit 32 of the light source 31 is reflected off the reflector 33 to become generally parallel light, and is input from the first integrator lens 34 to the second integrator lens 35 to uniform the illuminance of the light to be input to the respective optical modulators 43. Subsequently, the light flux emitted from the second integrator lens 35 is input to the polarization beam splitter 36, and is subjected to polarization to obtain light in a predetermined polarization direction.

The light subjected to polarization and emitted by the polarization beam splitter 36 is input and condensed in the condensing lens 37, and is input to the dichroic mirror 38. With regard to the light input to the dichroic mirror 38, for example, the red wavelength band light is transmitted, and the green wavelength band light and blue wavelength band light are reflected. The red wavelength band light transmitted through the dichroic mirror 38 is transmitted through the reflective mirror 39 and field lens 40 (40-1), and is then input to the transmission-type polarization element 41 (41-1), and is illuminated on the optical modulator 43 (transmission-type liquid crystal element 43-1) through the optical compensation element 42 (42-1).

On the other hand, the light reflected off the dichroic mirror 38 is input to the dichroic mirror 45. With the dichroic mirror 45, the blue wavelength band light is transmitted, and the green wavelength band light is reflected. One of the separated light fluxes (green wavelength band light flux) is input to the field lens 40 (40-2), and transmission-type polarization element 41 (41-2), and is illuminated on the transmission-type liquid crystal display element 43-2 which is the optical modulator 43 through the optical compensation element 42 (42-2). The other separated light flux (blue wavelength band light flux) is guided to the field lens 40 (40-3) by the projector lens 46, reflective mirror 47, relay lens 48, and reflective mirror 49. Subsequently, the light flux is input to the field lens 40 (40-3) and reflection-type polarization element 41 (41-3), and is illuminated on the transmission-type liquid crystal display element 43-3 which is the optical modulator 43 through the optical compensation element 42 (42-3).

The red wavelength band light subjected to optical modulation at the transmission-type liquid crystal display element 43-1 is input to the transmission-type polarization element 44 (44-1), and according to the degree of modulation, a portion thereof is absorbed, and a portion thereof is transmitted and input to the color synthesizing prism 50. Also, the green wavelength band light subjected to optical modulation at the transmission-type liquid crystal display element 43-2 is input to the transmission-type polarization element 44 (44-2), and according to the degree of modulation, a portion thereof is absorbed, and a portion thereof is transmitted and input to the color synthesizing prism 50. Further, the blue wavelength band light subjected to optical modulation at the transmission-type liquid crystal display element 43-3 is input to the transmission-type polarization element 44 (44-3), and according to the degree of modulation, a portion thereof is absorbed, and a portion thereof is transmitted and input to the color synthesizing prism 50.

The color synthesizing prism 50 transmits the green wavelength band light, and reflects the red wavelength band light and blue wavelength band light. Subsequently, the light fluxes of the respective colors are synthesized and input to the projector lens 51, where the image thereof is enlarged to a predetermined scale factor and projected on a screen (not shown).

Now, with regard to displaying black gradation, an example of the transmission-type liquid crystal display device will be described as the image display device 2 by employing a liquid crystal display element of VA orientation as an example of the optical modulator 43.

When displaying the black gradation side, the driving voltage of the liquid crystal display element becomes a relatively small value, so it is ideal for the polarization state of light between polarization element (incident side), liquid crystal display element, and polarization element (emission side) to be unchangeable.

However, with the liquid crystal display element, in order to control the tilt direction of the liquid crystal at the time of applying voltage, a slight angular slope (pretilt) is commonly added to the direction of ±45 degrees as to the incident polarization axis of an optical beam even in a nonelectric field state. Therefore, as to light perpendicularly input to the liquid crystal display element, the liquid crystal display element servers as a minute phase difference element of which the optical axis is 45 degrees. Accordingly, in general, an optical compensation element is employed as an optical element for canceling out this minute phase difference.

Figure 9:
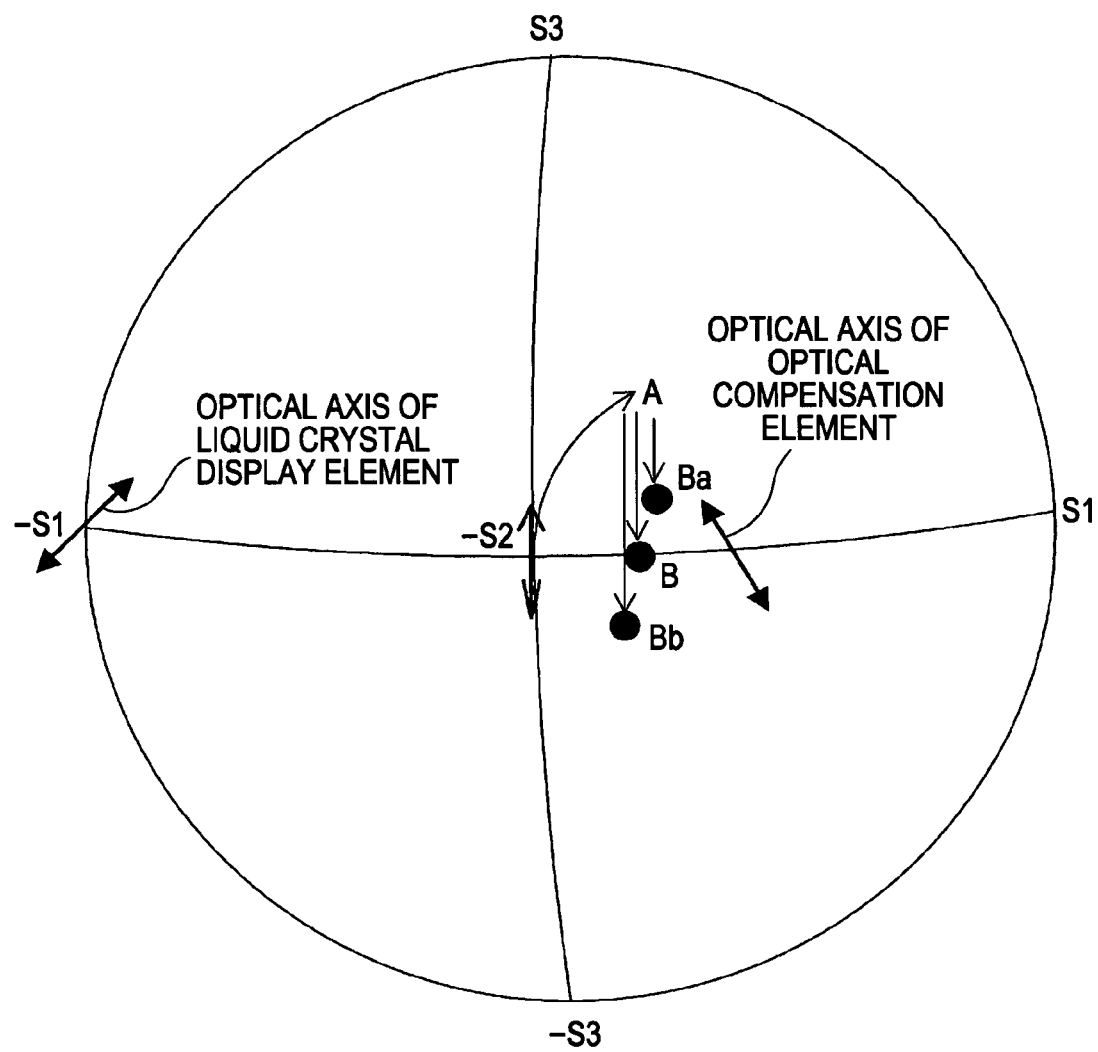
FIG. 9 is an explanatory diagram of a polarization state due to a Poincare sphere indicating an example of the role of an optical compensation element.

An example of the role of the optical compensation element 42 of the image display device 2 will be described with reference to the Poincare sphere in FIG. 9. As shown in FIG. 9, upon an optical beam transmitted through the incident-side transmission-type polarization element 41 being input to the optical compensation element 42, the optical beam is affected by the phase leading axis and phase difference to become a polarization state A in the drawing, i.e., a clockwise elliptical polarization state. Further, the optical beam is transmitted through the optical modulator 43 (e.g., transmission-type liquid crystal element) to become a polarization state B (linear polarization of which the polarization axis is inclined). Ideally, the optical compensation element 42 designed as described above is employed, whereby the optical beam can be changed to a liner polarization state even while considering the minute phase difference of the optical modulator 43. Also, the transmission-type polarization element 44 on the emission side having an absorption axis in this polarization direction is set to the emission side, whereby unwanted light leakage can be prevented.

However, in reality, the unevenness of very minute phase difference occurs even with the liquid crystal plane of the optical modulator 43 due to unevenness of the orientations of liquid crystal elements of the optical modulator 43, unevenness of cell gaps, unevenness of manufacturing processes, or the like in some cases, and in this case, the following phenomenon occurs.

Let us say that a great phase difference region and small phase difference region are distributed within the plane as to the center of the optical modulator 43, i.e., as to the phase difference of the screen center. In this state, in a case where the optical axis and phase difference of the optical compensation element 42 are set so as to cancel out the phase difference of the center of the optical modulator 43 with the minimum driving voltage V0, the polarization state of the optical beam returns to a linear polarization state through A and B, as described above.

However, with the great phase difference region, the polarization state of the optical beam is changed from A to Bb, and with the small phase difference region, the polarization state of the optical beam is changed from A to Ba, and consequently, both do not return to the original linear polarization state, and become a polarization state having an elliptical component. In this case, the optical beam leaks from the transmission-type polarization element 44 (emission side) to the projector lens 47 side, and accordingly, unevenness of brightness occurs on the screen regardless of a black state. Further, in a case where the respective colors of RGB are synthesized, unevenness of chromaticity occurs.

As a technique for reducing unevenness of brightness within the plane, there can be conceived a method for changing a phase difference distribution within the plane of the optical modulator 43, i.e., applied voltage within each plane (so-called 3Dγ method). For example, a screen region is divided into around hundred regions, and individual input signal/output signal property is given to each of the regions, whereby an even image can be realized without unevenness of brightness and chromaticity. However, this method does not have to be employed for the gradation on the black side.

As an example, the voltage/brightness property between the phase differences at the screen center, great phase difference region, and small phase difference region will be described in a case where the optical compensation element is set such as described in FIG. 9, with reference to FIG. 3.

As shown in FIG. 3, the optical compensation element 42 is set so as to cancel out the phase difference at the screen center with the minimum driving voltage V0, so the brightness at the screen center becomes a minimal value with the voltage V0, and the brightness at the small phase difference region becomes a brightness minimal value with the voltage satisfying V>V0. Note that the value of V at this time depends on the property of each element such as the difference of the phase differences of the optical modulators 43, the phase leading axial angle and phase difference and so forth of the optical compensation element 42. On the other hand, with the great phase difference region, there is no brightness minimal value with V0 or greater, and the brightness increases along with application of voltage.

Similar description will be made with reference to FIG. 9. With the small phase difference region in the polarization state Ba, the polarization state Ba can return to the polarization state B by applying voltage to the optical modulator 43. However, with the great phase difference region in the polarization state Bb, the polarization state Bb does not return to the polarization state B even if voltage is applied to the optical modulator 43. Therefore, when attempting to uniform the brightness within the screen, coordinating has to be made with the minimum brightness with the great phase difference region. In this case, as can be understood from FIG. 3, the brightness is coordinated with not the brightness L0 at the driving voltage V0 of the screen center but the brightness L1 at the driving voltage V0 of the great phase difference region, and consequently, there is a great disadvantage wherein contrast decreases.

To this end, with the present invention, the optical axis (phase leading axis, phase delaying axis) and phase difference of the optical compensation element 42 are adjusted so as to cancel out the phase difference of a region having a relatively great phase difference of the optical modulator 43 with the minimum driving voltage V0. An example of the first setting method with the image display device 2 will be described below.

The first setting method with the image display device 2 will be performed as follows. That is to say, as shown in FIG. 4A, an image is projected on the entire region of the optical modulator 43 (e.g., liquid crystal display element) through the projector lens 47 with the driving voltage V0. As shown in FIG. 4B, upon the optical compensation element 42 being rotated in this state for example, the phase leading axis of the optical compensation element 42 changes. In a case where a phase difference distribution within the plane of the optical modulator 43 is even, the brightness of the screen entire region becomes the minimum at a particular position, so the phase leading axis of the optical compensation element 42 should be set in this position. However, in a case where there is unevenness of phase difference within the plane of the optical modulator 43, the rotation angle where the brightness of an image projected by rotating the optical compensation element 42 becomes the minimum depends on positions within the image.

For example, let us say that, in FIG. 4A, as to a center region 5 of a projected image, the phase difference of a region 1 is greater, and the phase difference of a region 3 is smaller. At this time, if we say that the rotation position of the optical compensation element 42 has been adjusted such that the brightness of the center region 5 becomes the minimum, in order to minimize the brightness of the region 1, the rotation position should be moved in a direction a, and in order to minimize the brightness of the region 3, the rotation position should be moved in a direction b.

That is to say, if we say that the maximum value of rotation angles θ1 through θ9 of the optical compensation element 42, which minimizes the brightness of each of the regions 1 through 9, is θMAX, and if we set θ=θMAX in FIG. 4B, the phase difference of a region having the greatest phase difference can be canceled out consequently. Ideally, the phase difference of a region having the greatest phase difference, of the optical modulator 43 should be canceled out as much as possible. However, this is not indispensable, and rather, a region having a relatively great phase difference is determined to be canceled out, whereby an even image having little unevenness can be realized. Also, with this example, the image region is divided into nine, but may be divided into any appropriate number, whether five or a hundred, i.e., the number of divisions should be determined on balance with desired performance. Also, with this example, when searching a region having a relatively great phase difference, the projected image is observed while rotating the optical compensation element 42. For example, in a case where a phase difference distribution peculiar to the optical modulator 43 is known, and for example, in a case where it has been known that the phase difference between the regions 1 and 9 is great, the optical compensation element 42 should be adjusted so as to reduce the brightness of these regions.

Next, an example of the second setting method will be described. The second setting method is performed as follows. That is to say, as shown in FIG. 5A, with the phase difference distribution within the plane of the optical modulator 43 (e.g., liquid crystal display element), (1) Case where the phase difference of a certain region of the screen, e.g., the phase difference of the region 5 in FIG. 5A is relatively smaller than the phase differences of other regions, or (2) Case where the phase difference of a certain region of the screen is known to be around the center as compared to the phase differences of the other regions, the following adjustment method is available.

For example, let us say that a certain optical modulator 43 has the following particular phase difference distribution. For example, let us say that the phase difference of the region 1 is great, the phase difference of the region 7 is small, and the phase difference of the region 5 is around an average between the regions 1 and 7. Such a phase difference distribution can occur due to the process cause of the optical modulator 43, or the like. In this case, the minimum driving voltage as to the optical modulator 43 is set from V0 to V1 (>V0), and an image is projected through the projector lens 48. In this state, the optical compensation element 42 is rotated and fixed such that the brightness of the region 5 becomes the minimum.

In a case where the position of the optical compensation element 42 has been set thus, as shown in FIG. 5B, the region 5 has brightness/driving voltage property wherein the brightness becomes the minimum at the voltage V1 like the center. Conversely, with the region 1 having a greater phase difference, similar to the great phase difference region, the voltage which minimizes the brightness becomes smaller than V1, and with the region 7 having a smaller phase difference, similar to the small phase difference region, the voltage which minimizes the brightness becomes greater than V1. Now, if we say that the driving voltage V1 is set such that the region 7 having a greater phase difference becomes around a brightness minimal value around the driving voltage V0, the driving voltage can be set such that a region having a great phase difference becomes a brightness minimal value around the driving voltage V0, consequently.

According to the above-mentioned adjustment, the minimum driving voltage of a region having a great phase difference can be set to V0. This method is advantageous in that the optical compensation element 42 should be adjusted by viewing only one point within the screen in a case where the optical modulator 43 has a particular phase difference distribution. Similarly, even in a case where the phase difference of a certain region (e.g., region 5) of the screen is relatively small as compared to the phase differences of the other regions, the optical compensation element 42 is set such that the region 5 becomes a brightness minimal value at the voltage V1, and also the voltage V1 is set such that the other regions become a brightness minimal value around the voltage V0, whereby the same adjustment method can be performed.

Figure 10:
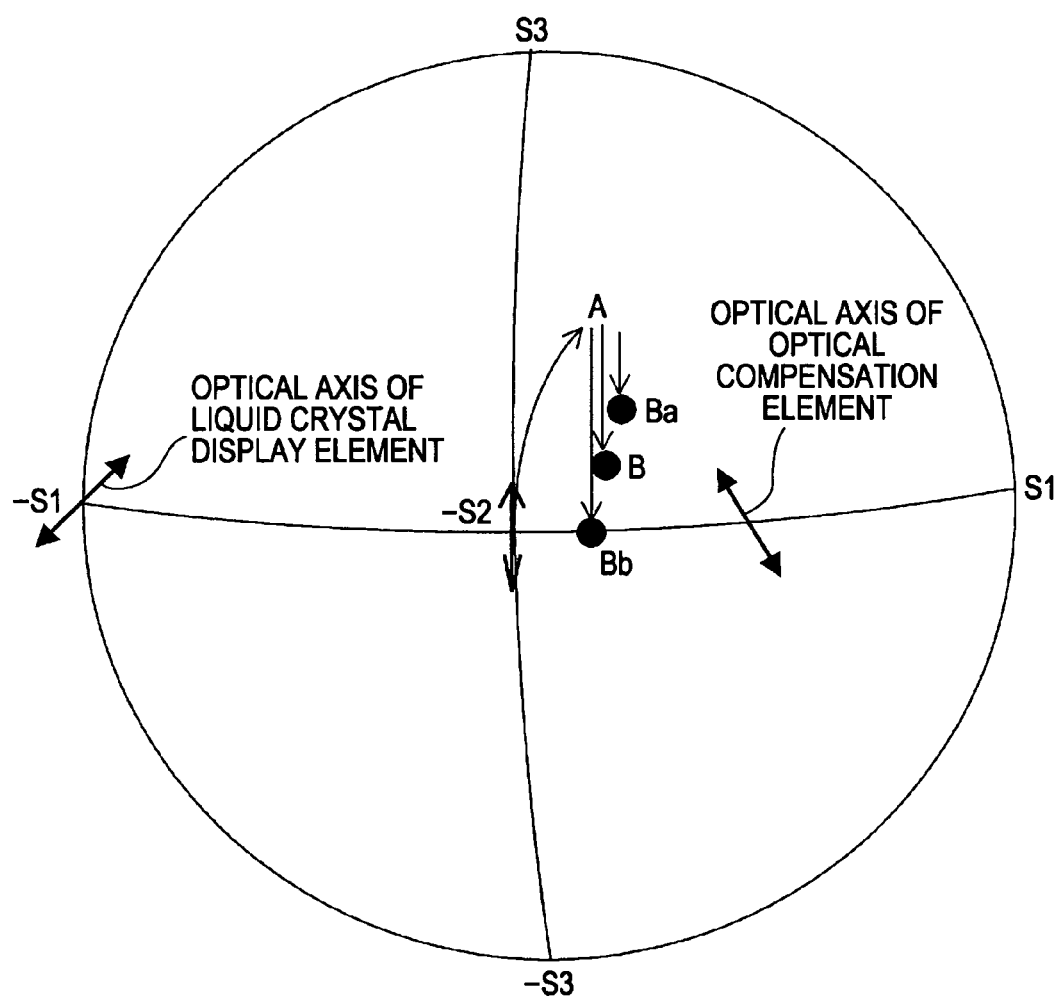
FIG. 10 is a voltage/brightness property diagram on the low voltage side.

Settings are performed as described above, whereby the polarization state can be represented such as shown in FIG. 10, and the voltage/brightness property on the low voltage side can be represented such as shown in FIG. 7. As shown in FIG. 7, upon referencing the voltage/brightness property, the phase leading axis and phase difference of the optical compensation element 42 are set so as to cancel out the phase difference of the great phase difference region as to the minimum driving voltage V0, whereby the great phase difference region becomes a brightness minimal value at V0.

On the other hand, the brightness minimal values of the screen center, and the small phase difference region become V0 or greater, so electric adjustment is added to the output voltage, for example, at the time of OIRE (IRE: unit representing the amplitude of a video signal, U.S. radio institute), such as V0 [V] for the great phase difference region, V1 [V] for the screen center, and V2 [V] for the small phase difference region, whereby a high-quality image having a high contrast ratio can be realized with little unevenness of brightness and chromaticity.

The above-mentioned relations will be described as the polarization state on a Poincare sphere with reference to FIG. 10. As shown in FIG. 10, with the great phase difference region, the angle of the optical axis (phase leading axis, phase delaying axis) and phase difference of the optical compensation element 42 are set so as to obtain linear polarization as the polarization before input to the transmission-type polarization element 44 (emission side). According to such a setting, even if the polarization state becomes a state B due to the screen center, or state Ba due to the small phase difference region, both can be changed to the polarization state Bb by applying voltage to the liquid crystal, and consequently, a state having no polarization disorder can be realized as to the screen entire region.

With the above-mentioned image display device 2, the optical compensation element 42 is set so as to cancel out the phase difference of a region having great phase difference of the optical modulator 43 with the minimum driving voltage V0 to be applied to the optical modulator 43. For example, the optical axis (phase leading axis, phase delaying axis) and phase difference of the optical compensation element 42 are set. Thus, with the optical compensation element 42, the brightness of a region having a relatively great phase difference within the optical modulator 43 becomes a minimal value with the minimum driving voltage V0 to be applied to the optical modulator 43, whereby the screen entire region can be set to the brightness minimum value with a voltage value which is equal to or greater than the minimum driving voltage V0. This state is realized, whereby unevenness of brightness and unevenness of chromaticity can be reduced by adjusting input signal/output voltage property at each position within the plane of the optical modulator 43. Thus, unevenness of brightness and unevenness of chromaticity can be reduced while maintaining a high contrast ratio, and accordingly, a high-quality image can be realized.

Also, with the adjustment method of the above-mentioned image display device 2, for example, the optical axis (phase leading axis, phase delaying axis) and phase difference of the optical compensation element 42 are set so as to cancel out the phase difference of a region having great phase difference of the optical modulator 43 with the minimum driving voltage V0 to be applied to the optical modulator 43. That is to say, the installation position of the optical compensation element 42 is adjusted in a state in which the brightness of a projected image corresponding to a region having a relatively great phase difference within the optical modulator 43 becomes a minimal value with the minimum driving voltage V0 to be applied to the optical modulator 43. Therefore, the screen entire region of the optical modulator 43 can be set to the brightness minimum value with a voltage value which is equal to or greater than the minimum driving voltage V0. This state is realized, whereby unevenness of brightness and unevenness of chromaticity can be reduced by adjusting input signal/output voltage property at each position within the plane of the optical modulator 43. Thus, unevenness of brightness and unevenness of chromaticity can be reduced while maintaining a high contrast ratio, and accordingly, a high-quality image can be realized, which is advantageous.

Figure 11:
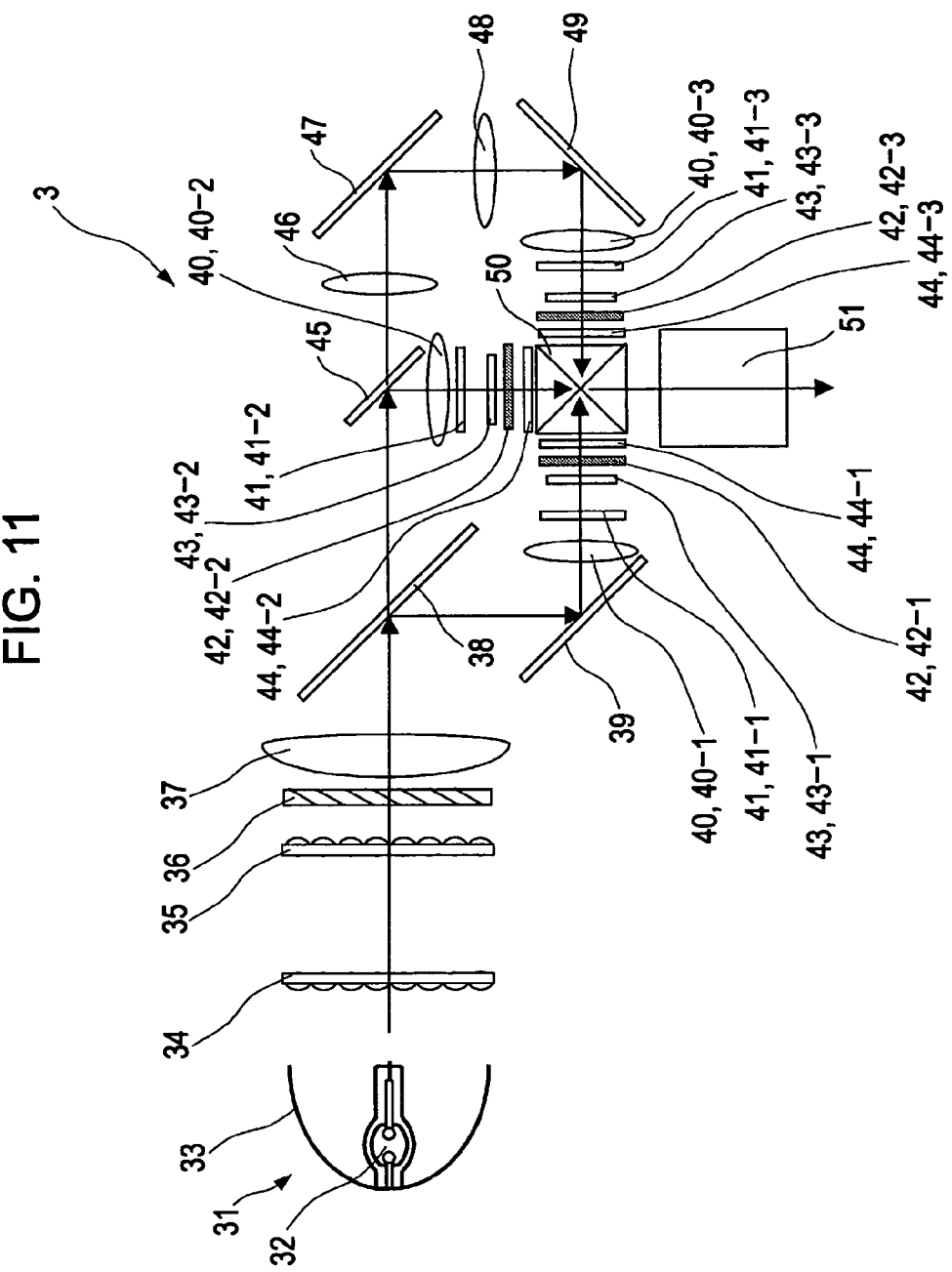
FIG. 11 is a schematic configuration diagram illustrating an imager display device according to an embodiment (third embodiment) of the present invention.

Next, an image display device according to an embodiment (third embodiment) of the present invention will be described with reference to the schematic configuration diagram in FIG. 11. As shown in FIG. 11, a lamp 31 is provided in an image display device 3. A light emitting unit 32 of the lamp 31 is disposed in the focal position of a reflector 33. Also, the reflector 33 reflects the light emitted from the lamp 31 to output this as generally parallel light. A first integrator lens 34 and a second integrator lens 35 are installed sequentially on the optical path of the light reflected off the reflector 33. The first integrator lens 34 and second integrator lens 35 uniform the illuminance of light to be input to a later-described optical modulator 43. A polarization beam splitter 36 is installed on the optical path of the light emitted from the second integrator lens 35. The polarization beam splitter 36 is for converting incident light into light in a predetermined polarization direction. A condensing lens 37 is provided on the optical path of the light emitted from the polarization beam splitter 36.

A dichroic mirror 38 is installed on the optical path of the light emitted from the condensing lens 37. The dichroic mirror 38 separates incident light into red wavelength band light, green wavelength band light, and blue wavelength band light. For example, the dichroic mirror 38 transmits the red wavelength band light, and reflects the green wavelength band light and blue wavelength band light. A reflective mirror 39 is provided on the optical path of the transmitted red wavelength band light, and a field lens 40 (40-1) is installed on the optical path of the light reflected off the reflective mirror 39. A transmission-type polarization element 41 (41-1) on the incident side, a transmission-type liquid crystal display element 43-1 which is an optical modulator 43, an optical compensation element 42 (42-1), a transmission-type polarization element 44 (44-1) on the emission side are installed sequentially on the optical path of the light transmitted through the field lens 40 (40-1).

On the other hand, a dichroic mirror 45 is provided on the optical path of the light reflected off the dichroic mirror 38. The dichroic mirror 45 transmits, of incident light, blue wavelength band light, and reflects the green wavelength band light. A field lens 40 (40-2) is installed on the optical path of one separated optical flux (green wavelength band light flux). A transmission-type polarization element 41 (41-2) on the incident side, a transmission-type liquid crystal display element 43-2 which is the optical modulator 43, an optical compensation element 42 (42-2), and a transmission-type polarization element 44 (44-2) on the emission side are installed sequentially on the optical path of the light transmitted through the field lens 40 (40-2).

A projector lens 46, and a reflective mirror 47 are installed on the optical path of the other separated light flux (blue wavelength band light flux). A relay lens 48, and a reflective mirror 49 are installed on the optical path of the light reflected off the reflective mirror 47. A filed lens 40 (40-3) is installed on the optical path of the light reflected off the reflective mirror 49. A transmission-type polarization element 41 (41-3) on the incident side, a transmission-type liquid crystal display element 43-3 which is the optical modulator 43, an optical compensation element 42 (42-3), and a transmission-type polarization element 44 (44-3) on the emission side are installed sequentially on the optical path of the light transmitted through the field lens 40 (40-3).

The transmission-type liquid crystal display element 43-1 is for subjecting the red wavelength band light to optical modulation. The light subjected to optical modulation by the transmission-type liquid crystal display element 43-1 is input to the transmission-type polarization element 44 (44-1) on the emission side, and according to the degree of modulation of the transmission-type liquid crystal display element 43-1, a portion thereof is transmitted, and a portion thereof is absorbed. A color synthesizing prism 50 is installed at a position to which this transmitted light is input. The transmission-type liquid crystal display element 43-2 is for subjecting the green wavelength band light to optical modulation. The light subjected to optical modulation by the transmission-type liquid crystal display element 43-2 is input to the transmission-type polarization element 44 (44-2) on the emission side, and according to the degree of modulation of the transmission-type liquid crystal display element 43-2, a portion thereof is transmitted, and a portion thereof is absorbed. The color synthesizing prism 50 is installed at a position to which this transmitted light is input. The transmission-type liquid crystal display element 43-3 is for subjecting the blue wavelength band light to optical modulation. The light subjected to optical modulation by the transmission-type liquid crystal display element 43-3 is input to the transmission-type polarization element 44 (44-3) on the emission side, and according to the degree of modulation of the transmission-type liquid crystal display element 43-3, a portion thereof is transmitted, and a portion thereof is absorbed. The color synthesizing prism 50 is installed at a position to which this transmitted light is input.

The color synthesizing prism 50 is configured to transmit the green wavelength band light, and reflect the red wavelength band light and blue wavelength band light, and is for synthesizing the light fluxes of the respective colors. A projector lens 51 is installed in the emission direction of the synthesized light. The projector lens 51 enlarges incident light to a predetermined scale factor to emit this. A screen (not shown) where the image emitted from the projector lens 51 is projected is installed in the emission direction thereof.

Each of the above-mentioned respective optical compensation elements 42 is installed in a state in which the center portion of each of the optical modulators 43 becomes the darkest when applying greater voltage than the minimum driving voltage V0 to be applied to the optical modulator 43 corresponding to each of the optical compensation elements 42.

For example, multiple voltage values at the time of OIRE are provided so as to correspond to each position within the plane of the optical modulator 43. Each of the multiple voltage values becomes a brightness minimal voltage value.

Also, the above-mentioned image display device 3 may be a three-LCD-type image display device. For example, optical modulators 43 (43-1, 43-2, and 43-3) made up of three transmission-type liquid crystal elements of the three-LCD-type image display device modulate optical beams of the red, green, and blue channels, respectively. Subsequently, at least the green-channel transmission-type liquid crystal element 43-2 includes an optical compensation element 42-2 having operation for canceling out phase difference generated therein. The optical compensation element 42-2 is installed in a state in which a projected image corresponding to the center portion of the green-channel transmission-type liquid crystal element 43-2 becomes the darkest when applying voltage greater than the minimum driving voltage V0 to be applied to the green-channel transmission-type liquid crystal display element 43-2.

Also, in a case where the optical modulator 43 has a phase difference distribution within the plane thereof, voltage is set so as to make the brightness of a projected image corresponding to a region having a great phase difference within the plane of the optical modulator 43 the darkest when applying the voltage to the optical modulator 43.

Now, with regard to displaying black gradation, an example of the transmission-type liquid crystal display device will be described as the image display device 3 by employing a liquid crystal display element of VA orientation as an example of the optical modulator 43.

When displaying the black gradation side, the driving voltage of the liquid crystal display element becomes a relatively small value, so it is ideal for the polarization state of light between polarization element (incident side), liquid crystal display element, and polarization element (emission side) to be unchangeable.

However, with the liquid crystal display element, in order to control the tilt direction of the liquid crystal at the time of applying voltage, a slight angular slope (pretilt) is commonly added to the direction of ±45 degrees as to the incident polarization axis of an optical beam even in a nonelectric field state. Therefore, as to light perpendicularly input to the liquid crystal display element, the liquid crystal display element servers as a minute phase difference element of which the optical axis is 45 degrees. Accordingly, in general, an optical compensation element is employed as an optical element for canceling out this minute phase difference.

Figure 12:
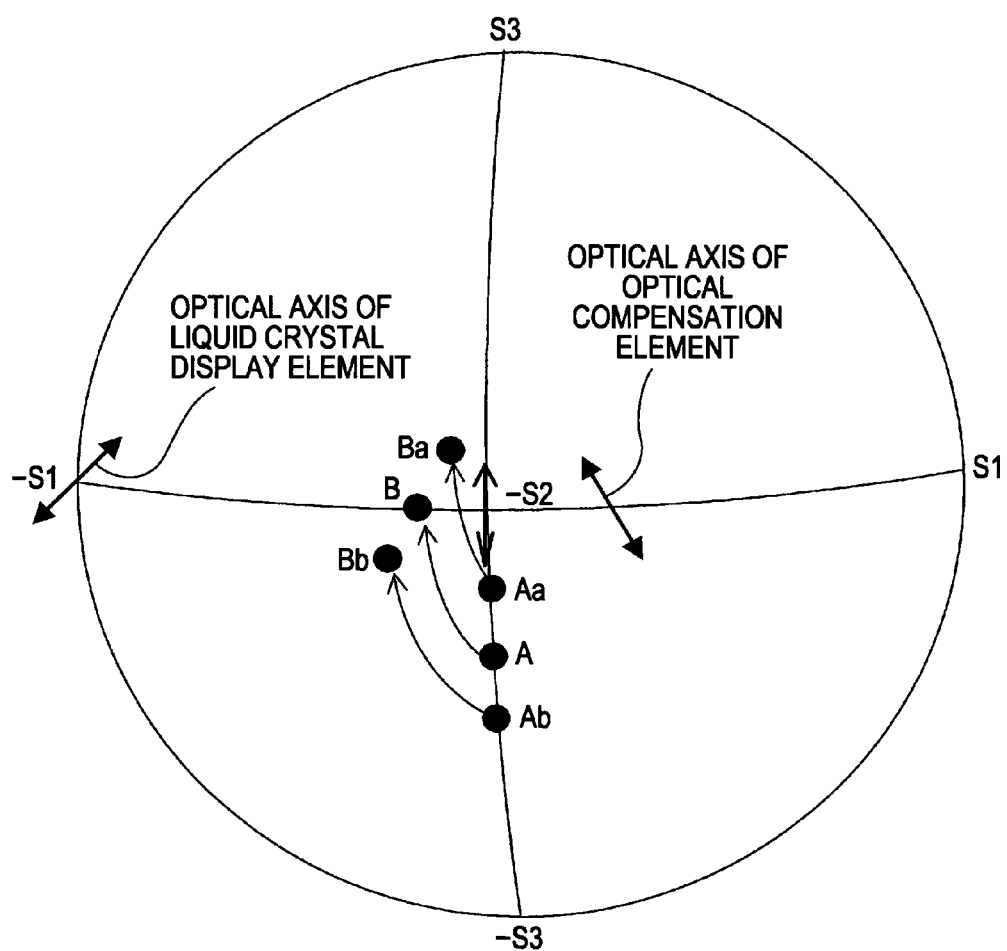
FIG. 12 is an explanatory diagram of a polarization state due to a Poincare sphere indicating an example of the role of an optical compensation element.

An example of the role of the optical compensation element 42 of the image display device 3 will be described with reference to the Poincare sphere in FIG. 12. As shown in FIG. 12, upon an optical beam transmitted through the optical modulator 43 (e.g., transmission-type liquid crystal modulator) being input to the optical compensation element 42, the optical beam is affected by the phase leading axis and phase difference to become a polarization state A in the drawing, i.e., a clockwise elliptical polarization state. Ideally, the optical compensation element 42 designed as described above is employed, whereby the optical beam can be changed to a liner polarization state even while considering the minute phase difference of the optical modulator 43. Also, the transmission-type polarization element 44 on the emission side having an absorption axis in this polarization direction is set to the emission side, whereby unwanted light leakage can be prevented.

However, in reality, the unevenness of very minute phase difference occurs even with the liquid crystal plane of the optical modulator 43 due to unevenness of the orientations of liquid crystal elements of the optical modulator 43, unevenness of cell gaps, unevenness of manufacturing processes, or the like in some cases, and in this case, the following phenomenon occurs.

Let us say that the great phase difference region and small phase difference region are distributed within the plane as to the center of the optical modulator 43, i.e., as to the phase difference of the screen center. In this state, in a case where the optical axis and phase difference of the optical compensation element 42 are set so as to cancel out the phase difference of the center of the optical modulator 43 with the minimum driving voltage V0, the polarization state of the optical beam returns to a linear polarization state through A and B, as described above.

However, with the great phase difference region, the polarization state of the optical beam is changed from Ab to Bb, and with the small phase difference region, the polarization state of the optical beam is changed from Aa to Ba, and consequently, both do not return to the original linear polarization state, and become a polarization state having an elliptical component. In this case, the optical beam leaks from the transmission-type polarization element 44 (emission side) to the projector lens 47 side, and accordingly, unevenness of brightness occurs on the screen regardless of a black state. Further, in a case where the respective colors of RGB are synthesized, unevenness of chromaticity occurs.

As a technique for reducing unevenness of brightness within the plane, there can be conceived a method for changing a phase difference distribution within the plane of the optical modulator 43, i.e., applied voltage within each plane (so-called 3Dγ method). For example, a screen region is divided into around hundred regions, and individual input signal/output signal property is given to each of the regions, whereby an even image can be realized without unevenness of brightness and chromaticity. However, this method does not have to be employed for the gradation on the black side.

As an example, the voltage/brightness property between the phase differences at the screen center, great phase difference region, and small phase difference region will be described in a case where the optical compensation element is set such as described in FIG. 12, with reference to FIG. 3.

As shown in FIG. 3, the optical compensation element 42 is set so as to cancel out the phase difference at the screen center with the minimum driving voltage V0, so the brightness at the screen center becomes a minimal value with the voltage V0, and the brightness at the small phase difference region becomes a brightness minimal value with the voltage satisfying V>V0. Note that the value of V at this time depends on the property of each element such as the difference of the phase differences of the optical modulators 43, the phase leading axial angle and phase difference and so forth of the optical compensation element 42. On the other hand, with the great phase difference region, there is no brightness minimal value with V0 or greater, and the brightness increases along with application of voltage.

Similar description will be made with reference to FIG. 12. With the small phase difference region in the polarization state Ba, the polarization state Ba can return to the polarization state B by applying voltage to the optical modulator 43. However, with the great phase difference region in the polarization state Bb, the polarization state Bb does not return to the polarization state B even if voltage is applied to the optical modulator 43. Therefore, when attempting to uniform the brightness within the screen, coordinating has to be made with the minimum brightness with the great phase difference region. In this case, as can be understood from FIG. 3, the brightness is coordinated with not the brightness L0 at the driving voltage V0 of the screen center but the brightness L1 at the driving voltage V0 of the great phase difference region, and consequently, there is a great disadvantage wherein contrast decreases.

To this end, with the present invention, the optical axis (phase leading axis, phase delaying axis) and phase difference of the optical compensation element 42 are adjusted so as to cancel out the phase difference of a region having a relatively great phase difference of the optical modulator 43 with the minimum driving voltage V0. An example of the first setting method with the image display device 3 will be described below.

The first setting method with the image display device 3 will be performed as follows. That is to say, as shown in FIG. 4A, an image is projected on the entire region of the optical modulator 43 (e.g., liquid crystal display element) through the projector lens 47 with the driving voltage V0. As shown in FIG. 4B, upon the optical compensation element 42 being rotated in this state, the phase leading axis of the optical compensation element 42 changes. In a case where a phase difference distribution within the plane of the optical modulator 43 is even, the brightness of the screen entire region becomes the minimum at a particular position, so the phase leading axis of the optical compensation element 42 should be set in this position. However, in a case where there is unevenness of phase difference within the plane of the optical modulator 43, the rotation angle where the brightness of an image projected by rotating the optical compensation element 42 becomes the minimum depends on positions within the image.

For example, let us say that, in FIG. 4A, as to a center region 5 of a projected image, the phase difference of a region 1 is greater, and the phase difference of a region 3 is smaller. At this time, if we say that the rotation position of the optical compensation element 42 has been adjusted such that the brightness of the center region 5 becomes the minimum, in order to minimize the brightness of the region 1, the rotation position should be moved in a direction a, and in order to minimize the brightness of the region 3, the rotation position should be moved in a direction b.

That is to say, if we say that the maximum value of rotation angles θ1 through θ9 of the optical compensation element 42, which minimizes the brightness of each of the regions 1 through 9, is θMAX, and if we set θ=θMAX in FIG. 4B, the phase difference of a region having the greatest phase difference can be canceled out consequently. Ideally, the phase difference of a region having the greatest phase difference, of the optical modulator 43 should be canceled out as much as possible. However, this is not indispensable, and rather, a region having a relatively great phase difference is determined to be canceled out, whereby an even image having little unevenness can be realized. Also, with this example, the image region is divided into nine, but may be divided into any appropriate number, whether five or a hundred, i.e., the number of divisions should be determined on balance with desired performance. Also, with this example, when searching a region having a relatively great phase difference, the projected image is observed while rotating the optical compensation element 42. For example, in a case where a phase difference distribution peculiar to the optical modulator 43 is known, and for example, in a case where it has been known that the phase difference between the regions 1 and 9 is great, the optical compensation element 42 should be adjusted so as to reduce the brightness of these regions.

Next, an example of the second setting method will be described. The second setting method is performed as follows. That is to say, as shown in FIG. 5A, with the phase difference distribution within the plane of the optical modulator 43, (1) Case where the phase difference of a certain region of the screen, e.g., the phase difference of the region 5 in FIG. 5A is relatively smaller than the phase differences of other regions, or (2) Case where the phase difference of a certain region of the screen is known to be around the center as compared to the phase differences of the other regions, the following adjustment method is available.

For example, let us say that a certain optical modulator 43 has the following particular phase difference distribution. For example, let us say that the phase difference of the region 1 is great, the phase difference of the region 7 is small, and the phase difference of the region 5 is around an average between the regions 1 and 7. Such a phase difference distribution can occur due to the process cause of the optical modulator 43, or the like. In this case, the minimum driving voltage as to the optical modulator 43 is set from V0 to V1 (>V0), and an image is projected through the projector lens 48. In this state, the optical compensation element 42 is rotated and fixed such that the brightness of the region 5 becomes the minimum.

In a case where the position of the optical compensation element 42 has been set thus, as shown in FIG. 5B, the region 5 has brightness/driving voltage property wherein the brightness becomes the minimum at the voltage V1 like the center. Conversely, with the region 1 having a greater phase difference, similar to the great phase difference region, the voltage which minimizes the brightness becomes smaller than V1, and with the region 7 having a smaller phase difference, similar to the small phase difference region, the voltage which minimizes the brightness becomes greater than V1. Now, if we say that the driving voltage V1 is set such that the region 7 having a greater phase difference becomes around a brightness minimal value around the driving voltage V0, the driving voltage can be set such that a region having a great phase difference becomes a brightness minimal value around the driving voltage V0, consequently.

According to the above-mentioned adjustment, the minimum driving voltage of a region having a great phase difference can be set to V0. This method is advantageous in that the optical compensation element 42 should be adjusted by viewing only one point within the screen in a case where the optical modulator 43 has a particular phase difference distribution. Similarly, even in a case where the phase difference of a certain region (e.g., region 5) of the screen is relatively small as compared to the phase differences of the other regions, the optical compensation element 42 is set such that the region 5 becomes a brightness minimal value at the voltage V1, and also the voltage V1 is set such that the other regions become a brightness minimal value around the voltage V0, whereby the same adjustment method can be performed.

Figure 13:
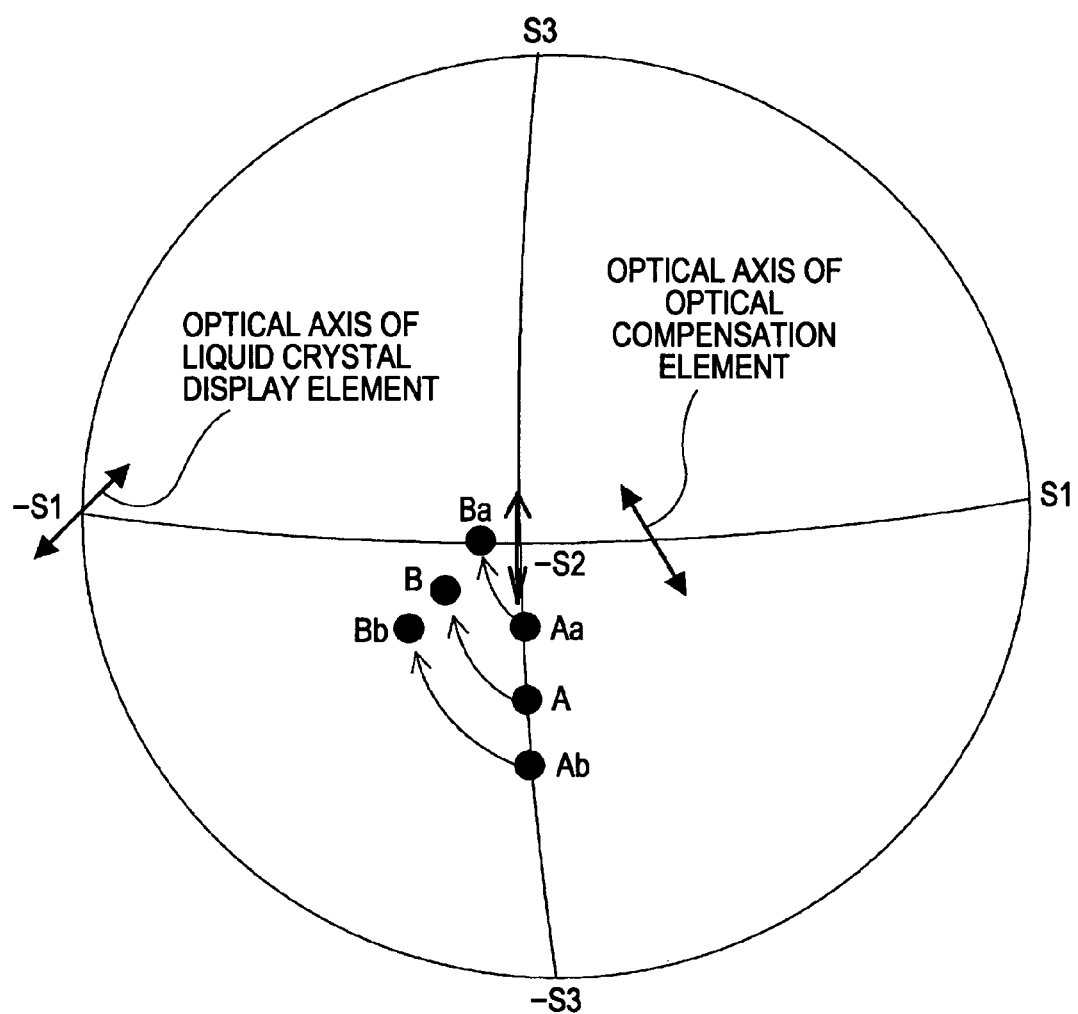
FIG. 13 is an explanatory diagram of a polarization state due to a Poincare sphere.
Figure 14:
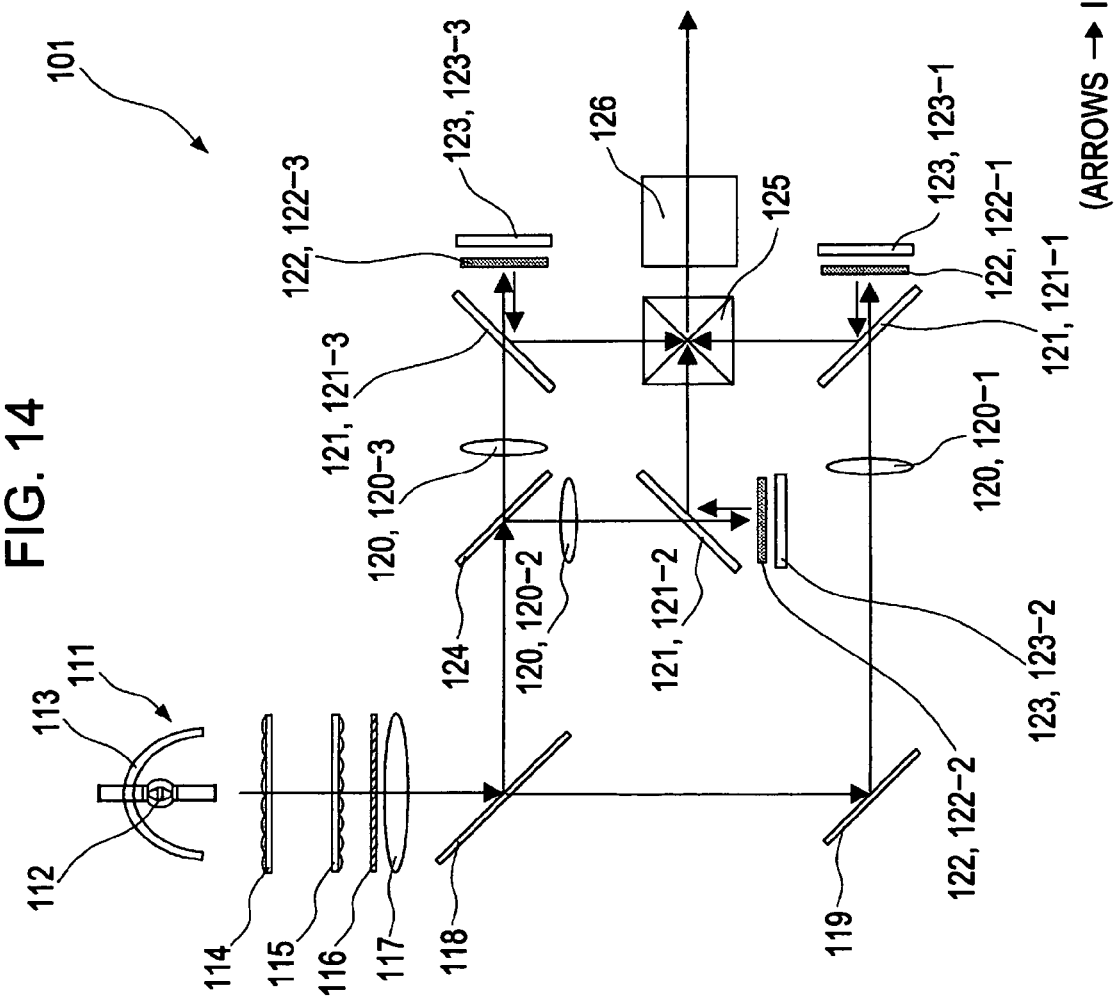
FIG. 14 is a schematic configuration diagram illustrating the schematic configuration of a transmission-type image display device according to the related art.

Settings are performed as described above, whereby the polarization state can be represented such as shown in FIG. 13, and the voltage/brightness property on the low voltage side can be represented such as shown in FIG. 7. As shown in FIG. 7, upon referencing the voltage/brightness property, the phase leading axis and phase difference of the optical compensation element 42 are set so as to cancel out the phase difference of the great phase difference region as to the minimum driving voltage V0, whereby the great phase difference region becomes a brightness minimal value at V0.

On the other hand, the brightness minimal values of the screen center, and the small phase difference region become V0 or greater, so electric adjustment is added to the output voltage, for example, at the time of 0IRE (IRE: unit representing the amplitude of a video signal, U.S. radio institute), such as V0 [V] for the great phase difference region, V1 [V] for the screen center, and V2 [V] for the small phase difference region, whereby a high-quality image having a high contrast ratio can be realized with little unevenness of brightness and chromaticity.

The above-mentioned relations will be described as the polarization state on a Poincare sphere with reference to FIG. 13. As shown in FIG. 13, with the great phase difference region, the angle of the optical axis (phase leading axis, phase delaying axis) and phase difference of the optical compensation element 42 are set so as to obtain linear polarization as the polarization before input to the transmission-type polarization element 44 (emission side). According to such a setting, even if the polarization state becomes a state B due to the screen center, or state Ba due to the small phase difference region, both can be changed to the polarization state Bb by applying voltage to the liquid crystal, and consequently, a state having no polarization disorder can be realized as to the screen entire region.

With the above-mentioned image display device 3, the optical compensation element 42 is set so as to cancel out the phase difference of a region having great phase difference of the optical modulator 43 with the minimum driving voltage V0 to be applied to the optical modulator 43. For example, the optical axis (phase leading axis, phase delaying axis) and phase difference of the optical compensation element 42 are set. Thus, with the optical compensation element 42, the brightness of a region having a relatively great phase difference within the optical modulator 43 becomes a minimal value with the minimum driving voltage V0 to be applied to the optical modulator 43, whereby the screen entire region can be set to the brightness minimum value with a voltage value which is equal to or greater than the minimum driving voltage V0. This state is realized, whereby unevenness of brightness and unevenness of chromaticity can be reduced by adjusting input signal/output voltage property at each position within the plane of the optical modulator 43. Thus, unevenness of brightness and unevenness of chromaticity can be reduced while maintaining a high contrast ratio, and accordingly, a high-quality image can be realized.

Also, with the adjustment method of the above-mentioned image display device 3, for example, the optical axis (phase leading axis, phase delaying axis) and phase difference of the optical compensation element 42 are set so as to cancel out the phase difference of a region having great phase difference of the optical modulator 43 with the minimum driving voltage V0 to be applied to the optical modulator 43. That is to say, the installation position of the optical compensation element 42 is adjusted in a state in which the brightness of a region having a relatively great phase difference within the optical modulator 43 becomes a minimal value with the minimum driving voltage V0 to be applied to the optical modulator 43. Therefore, the screen entire region of the optical modulator 43 can be set to the brightness minimum value with a voltage value which is equal to or greater than the minimum driving voltage V0. This state is realized, whereby unevenness of brightness and unevenness of chromaticity can be reduced by adjusting input signal/output voltage property at each position within the plane of the optical modulator 43. Thus, unevenness of brightness and unevenness of chromaticity can be reduced while maintaining a high contrast ratio, and accordingly, a high-quality image can be realized, which is advantageous.

With the above-mentioned respective examples, a liquid display element of VA orientation (vertical orientation) has been employed as the optical modulator 43. However, the present invention is not restricted to this, and accordingly, liquid crystal display elements of the other methods may be employed, such as TN orientation (twist nematic orientation), IPS (In Plane Switching) orientation (while normal TFT applies electric voltage in the thickness direction of the liquid crystal sandwiched with glass substrates, the IPS method applies electric voltage in the plane direction of the substrate), twist VA orientation, OCB (optically compensated birefringence) orientation (one of wide viewing angle techniques for a liquid crystal panel; the greatest feature is response speed of around 5 ms. It is a characteristic of a liquid crystal element exhibit orientation in a arc-shaped state called "bend orientation", and upon applying voltage, the liquid crystal element operates at high speed), or the like.

Also, with the above-mentioned respective examples, examples in the case where the optical axis (phase leading axis) is 0 through 45 degrees (let us say that the polarization axis is 0 degree, and the optical axis of the liquid crystal is 45 degrees) as the optical compensation element 42 are shown on Poincare spheres. However, the present invention is not restricted to this, and accordingly, optical compensation plates of all of the methods for canceling out the phase difference with the liquid crystal may be employed.

With the above-mentioned respective examples, description has been made regarding three-LCD-type optical systems, but an image display device employing a single board may be employed. As the light source 11 with the above-mentioned respective examples, an ultrahigh pressure (UHP) lamp, light emitting diode (LED), laser diode (LD), or the like may be employed.

With the above-mentioned examples, three-LCD-type illumination devices have been described, but the respective channels of RGB have not been distinguished. The relations between the optical modulators (liquid crystal display elements) 23, 24 and the optical compensation elements 22, 42 may be satisfied regarding all of these panels, or may be satisfied regarding only one channel in some cases. In the case of satisfying only one channel, it is desirable to select the green channel (Gch) when considering visibility property, influence on brightness, influence on contrast, and so forth.

With the above-mentioned examples, optical modulators (liquid crystal elements) for three sheets (RGB) have been employed. However, the present invention is not restricted to this, and accordingly, a single-board type made up of a sheet of liquid crystal, two-sheet type, or many more sheets type may be employed.

It should be understood by those skilled in the art that various modifications, combinations, sub-combinations and alterations may occur depending on design requirements and other factors insofar as they are within the scope of the appended claims or the equivalents thereof.

What is claimed is:

1. An image display device comprising:
   an optical modulator; and
   an optical compensation element configured to cancel out phase difference generated within said optical modulator;
   wherein said optical compensation element is installed in a state in which the brightness of a projected image corresponding to a region having relatively great phase difference within said optical modulator becomes a minimal value, at the minimum driving voltage to be applied to said optical modulator,
   the region being one of a plurality of regions within the optical modulator, and the optical compensation element being installed based on at least one relative phase difference, within the optical modulator, between regions.

2. The image display device according to claim 1, wherein a plurality of voltage values are provided at the time of OIRE so as to correspond to each position within the plane of said optical modulator.

3. The image display device according to claim 2, wherein each of said plurality of voltage values is a brightness minimal voltage value.

4. The image display device according to claim 1, wherein said image display device is a three-LCD-type image display device;
   and wherein optical modulators made up of three liquid crystal display elements of said three-LCD-type image display device modulate red, green, and blue channel optical beams, respectively;
   and wherein at least the green-channel optical modulator includes an optical compensation element having operation for cancelling out phase difference generated within said green-channel optical modulator;
   and wherein said optical compensation element is installed in a state in which the brightness of a projected image corresponding to a region having relatively great phase difference within said green-channel optical modulator becomes a minimal value, at the minimum driving voltage to be applied to said green-channel optical modulator.

5. An adjustment method for an image display device including
   an optical modulator, and
   an optical compensation element configured to cancel out phase difference generated within said optical modulator, said method comprising a step of:
   adjusting the installation position of said optical compensation element in a state in which the brightness of a projected image corresponding to a region having relatively great phase difference within said optical modulator becomes a minimal value, at the minimum driving voltage to be applied to said optical modulator,
   the region being one of a plurality of regions within the optical modulator, and the optical compensation element being installed based on at least one relative phase difference, within the optical modulator, between regions.

6. An image display device comprising:
an optical modulator; and
an optical compensation element configured to cancel out phase difference generated within said optical modulator;
wherein said optical compensation element is installed in a state in which a project image corresponding to the center portion of said optical modulator becomes the darkest when applying greater voltage than the minimum driving voltage to be applied to said optical modulator,
the optical compensation element being installed based on at least one relative phase difference among plurality of regions within the optical modulator.

7. The image display device according to claim 6, wherein a plurality of voltage values are provided at the time of OIRE so as to correspond to each position within the plane of said optical modulator.

8. The image display device according to claim 7, wherein each of said plurality of voltage values is a brightness minimal voltage value.

9. The image display device according to claim 6, wherein said image display device is a three-LCD-type image display device;
and wherein optical modulators made up of three liquid crystal display elements of said three-LCD-type image display device modulate red, green, and blue channel optical beams, respectively;
and wherein at least the green-channel optical modulator includes an optical compensation element having operation for cancelling out phase difference generated within said green-channel optical modulator;
and wherein said optical compensation element is installed in a state in which a project image corresponding to the center portion of said green-channel optical modulator becomes the darkest when applying greater voltage than the minimum driving voltage to be applied to said green-channel optical modulator.

10. The image display device according to claim 6, wherein said optical modulator has a phase difference distribution within the plane thereof;
and wherein voltage is set which makes the brightness of a projected image corresponding to a region having great phase difference within the plane of said optical modulator becomes the darkest when applying the voltage to said optical modulator.

11. An adjustment method for an image display device including
an optical modulator, and
an optical compensation element configured to cancel out phase difference generated within said optical modulator, said method comprising a step of:
adjusting the installation position of said optical compensation element in a state in which a project image corresponding to the center portion of said optical modulator becomes the darkest when applying greater voltage than the minimum driving voltage to be applied to said optical modulator,
the optical compensation element being installed based on at least one relative phase difference among a plurality of regions within the optical modulator.

* * * * *